(12) United States Patent
Rolfe

(10) Patent No.: US 11,157,817 B2
(45) Date of Patent: Oct. 26, 2021

(54) DISCRETE VARIATIONAL AUTO-ENCODER SYSTEMS AND METHODS FOR MACHINE LEARNING USING ADIABATIC QUANTUM COMPUTERS

(71) Applicant: D-Wave Systems Inc., Burnaby (CA)

(72) Inventor: Jason Rolfe, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 802 days.

(21) Appl. No.: 15/753,666

(22) PCT Filed: Aug. 18, 2016

(86) PCT No.: PCT/US2016/047627
§ 371 (c)(1),
(2) Date: Feb. 20, 2018

(87) PCT Pub. No.: WO2017/031356
PCT Pub. Date: Feb. 23, 2017

(65) Prior Publication Data
US 2018/0247200 A1    Aug. 30, 2018

Related U.S. Application Data

(60) Provisional application No. 62/206,974, filed on Aug. 19, 2015, provisional application No. 62/268,321, (Continued)

(51) Int. Cl.
*G06N 10/00* (2019.01)
*G06N 3/08* (2006.01)
*G06N 3/04* (2006.01)

(52) U.S. Cl.
CPC .......... *G06N 3/086* (2013.01); *G06N 3/0445* (2013.01); *G06N 3/0454* (2013.01);
(Continued)

(58) Field of Classification Search
None
See application file for complete search history.

(56) References Cited

U.S. PATENT DOCUMENTS 6,671,661 B1    12/2003  Bishop
7,135,701 B2    11/2006  Amin et al.
(Continued)

OTHER PUBLICATIONS

Prakash, Quantum Algorithms for Linear Algebra and Machine Learning, Doctoral Thesis, Technical Report No. UCB/EECS-2014-211, University of California at Berkeley, 2014, pp. 1-91 (Year: 2014).*

(Continued)

*Primary Examiner* — Wilbert L Starks
(74) *Attorney, Agent, or Firm* — Cozen O'Connor

(57) ABSTRACT

A computational system can include digital circuitry and analog circuitry, for instance a digital processor and a quantum processor. The quantum processor can operate as a sample generator providing samples. Samples can be employed by the digital processing in implementing various machine learning techniques. For example, the computational system can perform unsupervised learning over an input space, for example via a discrete variational auto-encoder, and attempting to maximize the log-likelihood of an observed dataset. Maximizing the log-likelihood of the observed dataset can include generating a hierarchical approximating posterior.

22 Claims, 8 Drawing Sheets

Related U.S. Application Data filed on Dec. 16, 2015, provisional application No. 62/307,929, filed on Mar. 14, 2016.

(52) U.S. Cl.
CPC ............ *G06N 3/0472* (2013.01); *G06N 3/08* (2013.01); *G06N 3/084* (2013.01); *G06N 3/088* (2013.01); *G06N 10/00* (2019.01)

(56) References Cited

U.S. PATENT DOCUMENTS

| | | |
|---|---|---|
| 7,418,283 B2 | 8/2008 | Amin |
| 7,533,068 B2 | 5/2009 | Maassen van den Brink et al. |
| 8,008,942 B2 | 8/2011 | van Den Brink et al. |
| 8,190,548 B2 | 5/2012 | Choi |
| 8,195,596 B2 | 6/2012 | Rose et al. |
| 8,421,053 B2 | 4/2013 | Bunyk et al. |
| 2005/0119829 A1 | 6/2005 | Bishop et al. |
| 2006/0115145 A1 | 6/2006 | Bishop et al. |
| 2010/0185422 A1 | 7/2010 | Hoversten |
| 2010/0228694 A1 | 9/2010 | Le et al. |
| 2011/0022369 A1 | 1/2011 | Carroll et al. |
| 2012/0254586 A1 | 10/2012 | Amin et al. |
| 2014/0040176 A1 | 2/2014 | Balakrishnan et al. |
| 2014/0187427 A1 | 7/2014 | MacReady et al. |
| 2014/0297235 A1 | 10/2014 | Arora et al. |
| 2015/0006443 A1 | 1/2015 | Rose et al. |
| 2015/0161524 A1 | 6/2015 | Hamze |

OTHER PUBLICATIONS

Venkatesh, et al., Quantum Fluctuation Theorems and Power Measurements, New J. Phys., 17, 2015, pp. 1-19 (Year: 2015).*
International Search Report, dated Nov. 18, 2016, for International Application No. PCT/US2016/047627, 3 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Dumoulin, V. et al., "On the Challenges of Physical Implementations of RBMs," Proceedings of the 28th AAAI Conference on Artificial Intelligence, vol. 2, Jul. 27, 2014, 7 pages.
Geordie, "First Ever DBM Trained Using a Quantum Computer," URL:https://dwave.wordpress.com/2014/1/06/first-ever-dbm-trained-using-a-quantum-computer, Jan. 6, 2014, 8 pages.
Geordie, "Training DBMs with Physical Neural Nets," URL:https://dwave.wordpress.com/2014/01/24 /training-dbms-with-physical-neural-nets/, Jan. 24, 2014, 10 pages.
Rezende et al., "Stochastic Backpropagation and Approximate Inference in Deep Generative Models," arXiv:1401.4082v3 [stat.ML] May 30, 2014, 14 pages.
Cho, Kyunghyun et al., "On the Properties of Neural Machine Translation: Encoder-Decoder Approaches", arXiv:1409.1259v2, [cs.CL] Oct. 7, 2014, 9 pages.
Fabius, Otto, et al., "Variational Recurrent Auto-Encoders", Accepted as workshop contributions at ICLR 2015, 5 pages.
Gregor, Karol, et al., "Draw: A Recurrent Neural Network For Image Generation", Proceedings of the 32nd International Conference on Machine Leaning, Lille, France, 2015, JMLR: W&CP vol. 37, Copyright 2015, 10 pages.
Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.
Hinton, Geoffrey E, et al., "Reducing the Dimensionality of Data with Neural Networks", Science, wwwsciencemag.org, vol. 313, Jul. 28, 2006, pp. 504-507.
Kingma, Diederik P, et al., "Semi-Supervised Learning with Deep Generative Models", arXiv:1406.5298v2 [cs.LG], Oct. 31, 2014, 9 pages.
Kingma, Diedrik, et al., "Auto-Encoding Variational Bayes", https://arxiv.org/abs/l312.6114v10, May 1, 2014.
Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.
Makhzani, Alireza, et al., "Adversarial Autoencoders", arXiv:1511.05644v2 [cs.LG], May 25, 2016, 16 pages
Mnih, Andriy, et al., "Variational Inference for Mote Carlo Objectives", Proceedings of the 33rd International Conference on Machine Learning, New York, NY USA, 2016, JMLR: W&CP vol. 48, 9 pages.
Olshausen, Bruno A, et al., "Emergence of simple cell receptive field properties by learning a sparse code for natural images", Nature, vol. 381, Jun. 13, 1996, pp. 607-609.
Rasmus, Antti, et al., "Semi-Supervised Learning with Ladder Networks", arXiv:1507.02672v2 [cs.NE] Nov. 24, 2015, 19 pages.
Rezende, Danilo J, et al., "Variational Inference with Normalizing Flows", Proceedings of the 32nd International Conference on Machine Learning, Lille, France 2015, JMLR: W&CP vol. 37, 9 pages.
Saliman, Tim, "A Structured Variational Auto-encoder for Learning Deep Hierarchies of Sparse Features", arXiv:1602.08734v1 [stat.ML] Feb. 28, 2016, 3 pages.
Salimans, Tim, et al., "Markov Chain Monte Carlo and Variational Inference: Bridging the Gap", arXiv:1410.6460v4 [stat.CO] May 19, 2015, 9 pages.
Sonderby, Casper K, et al., "Ladder Variational Autoencoders", arXiv:1602.02282v3 [stat.ML] May 27, 2016, 12 pages.
Wiebe, Nathan , et al., "Quantum Inspired Training for Boltzmann Machines", arXiv:1507.02642v1 [cs.LG] Jul. 9, 2015, 18 pages.
Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.

* cited by examiner (a) $q(\mathfrak{z},\varsigma,z|x)$ (b) $p(x,\mathfrak{z},\varsigma,z)$

DISCRETE VARIATIONAL AUTO-ENCODER SYSTEMS AND METHODS FOR MACHINE LEARNING USING ADIABATIC QUANTUM COMPUTERS

BACKGROUND

Field

The present disclosure generally relates to machine learning.

Machine Learning

Machine learning relates to methods and circuitry that can learn from data and make predictions based on data. In contrast to methods or circuitry that follow static program instructions, machine learning methods and circuitry can include deriving a model from example inputs (such as a training set) and then making data-driven predictions.

Machine learning is related to optimization. Some problems can be expressed in terms of minimizing a loss function on a training set, where the loss function describes the disparity between the predictions of the model being trained and observable data.

Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Machine learning can be used in situations where explicit approaches are considered infeasible. Example application areas include optical character recognition, search engine optimization, and computer vision.

Quantum Processor

A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution (i.e., the rate at which the Hamiltonian changes).

As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. As used herein an "adiabatic" evolution is an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

If the evolution is slow enough that the system is always in the instantaneous ground state of the evolution Hamiltonian, then transitions at anti-crossings (when the gap size is smallest) are avoided. Other evolution schedules, besides the linear evolution described above, are possible including non-linear evolution, parametric evolution, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. While classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present to annealing. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P,$$

where A(t) and B(t) are time dependent envelope functions. For example, A(t) can change from a large value to substantially zero during the evolution and $H_E$ can be thought of as an evolution Hamiltonian similar to $H_e$ described in the context of adiabatic quantum computation above. The disorder is slowly removed by removing $H_D$ (i.e., by reducing A(t)).

Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF SUMMARY

A method for unsupervised learning over an input space comprising discrete or continuous variables, and at least a subset of a training dataset of samples of the respective variables, to attempt to identify the value of at least one parameter that increases the log-likelihood of the at least a subset of a training dataset with respect to a model, the model expressible as a function of the at least one parameter, the method executed by circuitry including at least one processor, may be summarized as including forming a first latent space comprising a plurality of random variables, the plurality of random variables comprising one or more discrete random variables; forming a second latent space comprising the first latent space and a set of supplementary continuous random variables; forming a first transforming distribution comprising a conditional distribution over the set of supplementary continuous random variables, conditioned on the one or more discrete random variables of the first latent space; forming an encoding distribution comprising an approximating posterior distribution over the first latent space, conditioned on the input space; forming a prior distribution over the first latent space; forming a decoding distribution comprising a conditional distribution over the input space conditioned on the set of supplementary continuous random variables; determining an ordered set of conditional cumulative distribution functions of the supplementary continuous random variables, each cumulative distribution function comprising functions of a full distribution of at least one of the one or more discrete random variables of the first latent space; determining an inversion of the ordered set of conditional cumulative distribution functions of the supplementary continuous random variables; constructing a first stochastic approximation to a lower bound on the log-likelihood of the at least a subset of a training dataset; constructing a second stochastic approximation to a gradient of the lower bound on the log-likelihood of the at least a subset of a training dataset; and increasing the lower bound on the log-likelihood of the at least a subset of a training dataset based at least in part on the gradient of the lower bound on the log-likelihood of the at least a subset of a training dataset.

Increasing the lower bound on the log-likelihood of the at least a subset of a training dataset based at least in part on the gradient of the lower bound on the log-likelihood of the at least a subset of a training dataset may include increasing the lower bound on the log-likelihood of the at least a subset of a training dataset using a method of gradient descent. Increasing the lower bound on the log-likelihood of the at least a subset of a training dataset using a method of gradient descent may include attempting to maximize the lower bound on the log-likelihood of the at least a subset of a training dataset using a method of gradient descent. The encoding distribution and decoding distribution may be parameterized by deep neural networks. Determining an ordered set of conditional cumulative distribution functions of the supplementary continuous random variables may include analytically determining an ordered set of conditional cumulative distribution functions of the supplementary continuous random variables. The lower bound may be an evidence lower bound.

Constructing a first stochastic approximation to the lower bound of the log-likelihood of the at least a subset of a training dataset may include decomposing the first stochastic approximation to the lower bound into at least a first part comprising negative KL-divergence between the approximating posterior and the prior distribution over the first latent space, and a second part comprising an expectation, or at least a stochastic approximation to an expectation, with respect to the approximating posterior over the second latent space of the conditional log-likelihood of the at least a subset of a training dataset under the decoding distribution.

Constructing a second stochastic approximation to the gradient of the lower bound may include determining the gradient of the second part of the first stochastic approximation by backpropagation; approximating the gradient of the first part of the first stochastic approximation with respect to one or more parameters of the prior distribution over the first latent space using samples from the prior distribution; and determining a gradient of the first part of the first stochastic approximation with respect to parameters of the encoding distribution by backpropagation. Approximating the gradient of the first part of the first stochastic approximation with respect to one or more parameters of the prior distribution over the first latent space using samples from the prior distribution may include at least one of generating samples or causing samples to be generated by a quantum processor. A logarithm of the prior distribution may be, to within a constant, a problem Hamiltonian of a quantum processor. The method may further include generating samples or causing samples to be generated by a quantum processor; and determining an expectation with respect to the prior distribution from the samples. Generating samples or causing samples to be generated by at least one quantum processor may include performing at least one post-processing operation on the samples. Generating samples or causing samples to be generated by at least one quantum processor may include operating the at least one quantum processor as a sample generator to provide the samples from a probability distribution, wherein a shape of the probability distribution depends on a configuration of a number of programmable parameters for the at least one quantum processor, and wherein operating the at least one quantum processor as a sample generator comprises: programming the at least one quantum processor with a configuration of the number of programmable parameters for the at least one quantum processor, wherein the configuration of a number of programmable parameters corresponds to the probability distribution over the plurality of qubits of the at least one quantum processor; evolving the quantum processor; and reading out states for the qubits in plurality of qubits of the at least one quantum processor, wherein the states for the qubits in the plurality of qubits correspond to a sample from the probability distribution.

The method may further include at least one of generating, or at least approximating, samples or causing samples to be generated, or least approximated, by a restricted Boltzmann machine; and determining the expectation with respect to the prior distribution from the samples. The set of supplementary continuous random variables may include a plurality of continuous variables, and each one of the plurality of continuous variables may be conditioned on a different respective one of the plurality of random variables.

The method may further include forming a second transforming distribution, wherein the input space comprises a plurality of input variables, and the second transforming distribution is conditioned on one or more of the plurality of input variables and at least one of the one or more discrete random variables.

A computational system may be summarized as including hardware or circuitry, for example including at least one processor; and at least one nontransitory processor-readable storage medium that stores at least one of processor-executable instructions or data which, when executed by the at least one processor cause the at least one processor to execute any of the above described acts or any of the methods of claims 1 through 16.

A method for unsupervised learning by a computational system, the method executable by circuitry including at least one processor, may be summarized as including forming a model, the model comprising one or more model parameters; initializing the model parameters; receiving a training dataset comprising a plurality of subsets of the training dataset; testing to determine if a stopping criterion has been met; in response to determining the stopping criterion has not been met: fetching a mini-batch comprising one of the plurality of subsets of the training dataset, the mini-batch comprising input data; performing propagation through an encoder that computes an approximating posterior distribution over a discrete space; sampling from the approximating posterior distribution over a set of continuous random variables via a sampler; performing propagation through a decoder that computes an auto-encoded distribution over the input data; performing backpropagation through the decoder of a log-likelihood of the input data with respect to the auto-encoded distribution over the input data; performing backpropagation through the sampler that samples from the approximating posterior distribution over the set of continuous random variables to generate an auto-encoded gradient; determining a first gradient of a KL-divergence, with respect to the approximating posterior, between the approximating posterior distribution and a true prior distribution over the discrete space; performing backpropagation through the encoder of a sum of the auto-encoding gradient and the first gradient of the KL-divergence with respect to the approximating posterior; determining a second gradient of a KL-divergence, with respect to parameters of the true prior distribution, between the approximating posterior and the true prior distribution over the discrete space; determining at least one of a gradient or at least a stochastic approximation of a gradient, of a bound on the log-likelihood of the input data; updating the model parameters based at least in part on the determined at least one of the gradient or at least a stochastic approximation of the gradient, of the bound on the log-likelihood of the input data. Initializing the model parameters may include initializing the model parameters using random variables. Initializing the model parameters may include initializing the model parameters based at least in part on a pre-training procedure. Testing to determine if a stopping criterion has been met may include testing to determine if a threshold number N of passes through the training dataset have been run.

The method may further include receiving at least a subset of a validation dataset, wherein testing to determine if a stopping criterion has been met includes determining a measure of validation loss on the at least a subset of a validation dataset computed on two or more successive passes, and testing to determine if the measure of validation loss meets a predetermined criterion. Determining a second gradient of a KL-divergence, with respect to parameters of the true prior distribution, between the approximating posterior and the true prior distribution over the discrete space may include determining a second gradient of a KL-divergence, with respect to parameters of the true prior distribution, between the approximating posterior and the true prior distribution over the discrete space by generating samples or causing samples to be generated by a quantum processor.

Generating samples or causing samples to be generated by a quantum processor may include operating the at least one quantum processor as a sample generator to provide the samples from a probability distribution, wherein a shape of the probability distribution depends on a configuration of a number of programmable parameters for the at least one quantum processor, and wherein operating the at least one quantum processor as a sample generator comprises programming the at least one quantum processor with a configuration of the number of programmable parameters for the at least one quantum processor, wherein the configuration of a number of programmable parameters corresponds to the probability distribution over the plurality of qubits of the at least one quantum processor; evolving the at least one quantum processor; and reading out states for the qubits in plurality of qubits of the at least one quantum processor, wherein the states for the qubits in the plurality of qubits correspond to a sample from the probability distribution. Operating the at least one quantum processor as a sample generator to provide the samples from a probability distribution may include operating the at least one quantum processor to perform at least one post-processing operation on the samples. Sampling from the approximating posterior distribution over a set of continuous random variables may include generating samples or causing samples to be generated by a digital processor.

The method for unsupervised learning may further include dividing the discrete space into a first plurality of disjoint groups; and dividing the set of supplementary continuous random variables into a second plurality of disjoint groups, wherein performing propagation through an encoder that computes an approximating posterior over a discrete space includes: determining a processing sequence for the first and the second plurality of disjoint groups; and for each of the first plurality of disjoint groups in an order determined by the processing sequence, performing propagation through an encoder that computes an approximating posterior, the approximating posterior conditioned on at least one of the previous ones in the processing sequence of the second plurality of disjoint groups and at least one of the plurality of input variables. Dividing the discrete space into a first plurality of disjoint groups may include dividing the discrete space into a first plurality of disjoint groups by random assignment of discrete variables in the discrete space. Dividing the discrete space into a first plurality of disjoint groups may include dividing the discrete space into a first plurality of disjoint groups to generate even-sized groups in the first plurality of disjoint groups. Initializing the model parameters may include initializing the model parameter using random variables. Initializing the model parameters may include initializing the model parameter based at least in part on a pre-training procedure. Testing to determine if a stopping criterion has been met may include testing to determine if a threshold number N of passes through the training dataset have been run.

The method may further include receiving at least a subset of a validation dataset, wherein testing to determine if a stopping criterion has been met includes determining a measure of validation loss on the at least a subset of a validation dataset computed on two or more successive passes, and testing to determine if the measure of validation loss meets a predetermined criterion. Determining a second gradient of a KL-divergence, with respect to parameters of the true prior distribution, between the approximating posterior and the true prior distribution over the discrete space may include determining a second gradient of a KL-divergence, with respect to parameters of the true prior distribution, between the approximating posterior and the true prior distribution over the discrete space by generating samples or causing samples to be generated by a quantum processor.

Generating samples or causing samples to be generated by a quantum processor may include operating the at least one quantum processor as a sample generator to provide the samples from a probability distribution, wherein a shape of the probability distribution depends on a configuration of a number of programmable parameters for the analog processor, and wherein operating the at least one quantum processor as a sample generator comprises: programming the at least one quantum processor with a configuration of the number of programmable parameters for the at least one quantum processor, wherein the configuration of a number of programmable parameters corresponds to the probability distribution over the plurality of qubits of the at least one quantum processor, evolving the at least one quantum processor, and reading out states for the qubits in plurality of qubits of the at least one quantum processor, wherein the states for the qubits in the plurality of qubits correspond to a sample from the probability distribution. Operating the at least one quantum processor as a sample generator to provide the samples from a probability distribution may include operating the at least one quantum processor to perform at least one post-processing operation on the samples. Sampling from the approximating posterior over a set of continuous random variables may include generating samples or causing samples to be generated by a digital processor.

A computational system may be summarized as including hardware or circuitry, for example including at least one processor; and at least one nontransitory processor-readable storage medium that stores at least one of processor-executable instructions or data which, when executed by the at least one processor cause the at least processor to execute any of the above described acts or any of the methods of claims 18 through 37.

A method of unsupervised learning by a computational system, the method executable by circuitry including at least one processor, may be summarized as including determining a first approximating posterior distribution over at least one group of a set of discrete random variables; sampling from at least one group of a set of supplementary continuous random variables using the first approximating posterior distribution over the at least one group of the set of discrete random variables to generate one or more samples, wherein a transforming distribution comprises a conditional distribution over the set of supplementary continuous random variables, conditioned on the one or more discrete random variables; determining a second approximating posterior distribution and a first prior distribution, the first prior distribution over at least one layer of a set of continuous variables; sampling from the second approximating posterior distribution; determining an auto-encoding loss on an input space comprising discrete or continuous variables, the auto-encoding loss conditioned on the one or more samples; determining a first KL-divergence, or at least an approximation thereof, between the second posterior distribution and the first prior distribution; determining a second KL-divergence, or at least an approximation thereof, between the first posterior distribution and a second prior distribution, the second prior distribution over the set of discrete random variables; and backpropagating the sum of the first and the second KL-divergence and the auto-encoding loss on the input space conditioned on the one or more samples. The auto-encoding loss may be a log-likelihood.

A computational system may be summarized as including hardware or circuitry, for example including at least one processor; and at least one nontransitory processor-readable storage medium that stores at least one of processor-executable instructions or data which, when executed by the at least one processor cause the at least processor to execute any of the immediately above described acts or any of the methods of claims 39 through 40.

A method of unsupervised learning by a computational system, the method executable by circuitry including at least one processor, may be summarized as including determining a first approximating posterior distribution over a first group of discrete random variables conditioned on an input space comprising discrete or continuous variables; sampling from a first group of supplementary continuous variables based on the first approximating posterior distribution; determining a second approximating posterior distribution over a second group of discrete random variables conditioned on the input space and samples from the first group of supplementary continuous random variables; sampling from a second group of supplementary continuous variables based on the second approximating posterior distribution; determining a third approximating posterior distribution and a first prior distribution over a first layer of additional continuous random variables, the third approximating distribution conditioned on the input space, samples from at least one of the first and the second group of supplementary continuous random variables, and the first prior distribution conditioned on samples from at least one of the first and the second group of supplementary continuous random variables; sampling from the first layer of additional continuous random variables based on the third approximating posterior distribution; determining a fourth approximating posterior distribution and a second prior distribution over a second layer of additional continuous random variables, the fourth approximating distribution conditioned on the input space, samples from at least one of the first and the second group of supplementary continuous random variables, samples from the first layer of additional continuous random variables, and the second prior distribution conditioned on at least one of samples from at least one of the first and the second group of supplementary continuous random variables, and samples from the first layer of additional continuous random variables; determining a first gradient of a KL-divergence, or at least a stochastic approximation thereof, between the third approximating posterior distribution and the first prior distribution with respect to the third approximating posterior distribution and the first prior distribution; determining a second gradient of a KL-divergence, or at least a stochastic approximation thereof, between the fourth approximating posterior distribution and the second prior distribution with respect to the fourth approximating posterior distribution and the second prior distribution; determining a third gradient of a KL-divergence, or at least a stochastic approximation thereof, between an approximating posterior distribution over the discrete random variables and a third prior distribution with respect to the approximating posterior distribution over the discrete random variables and the third prior distribution, wherein the approximating posterior distribution over the discrete random variables is a combination of the first approximating posterior distribution over the first group of discrete random variables, and the second approximating posterior distribution over the second group of discrete random variables; backpropagating the first, the second and the third gradients of the KL-divergence to the input space. The third prior distribution may be a restricted Boltzmann machine.

A computational system may be summarized as including hardware or circuitry, for example including at least one processor and at least one nontransitory processor-readable storage medium that stores at least one of processor-executable instructions or data which, when executed by the at least one processor cause the at least processor to execute any of the immediately above described acts or any of the methods of claims 41 through 42.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Generalities

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

References to a processor or at least one processor refer to hardware or circuitry, with discrete or integrated, for example single or multi-core microprocessors, microcontrollers, central processor units, digital signal processors, graphical processing units, programmable gate arrays, programmed logic controllers, and analog processors, for instance quantum processors. Various algorithms and methods and specific acts are executable via one or more processors.

The headings provided herein are for convenience only and do not interpret the scope or meaning of the embodiments.

Quantum Hardware

Figure 1:
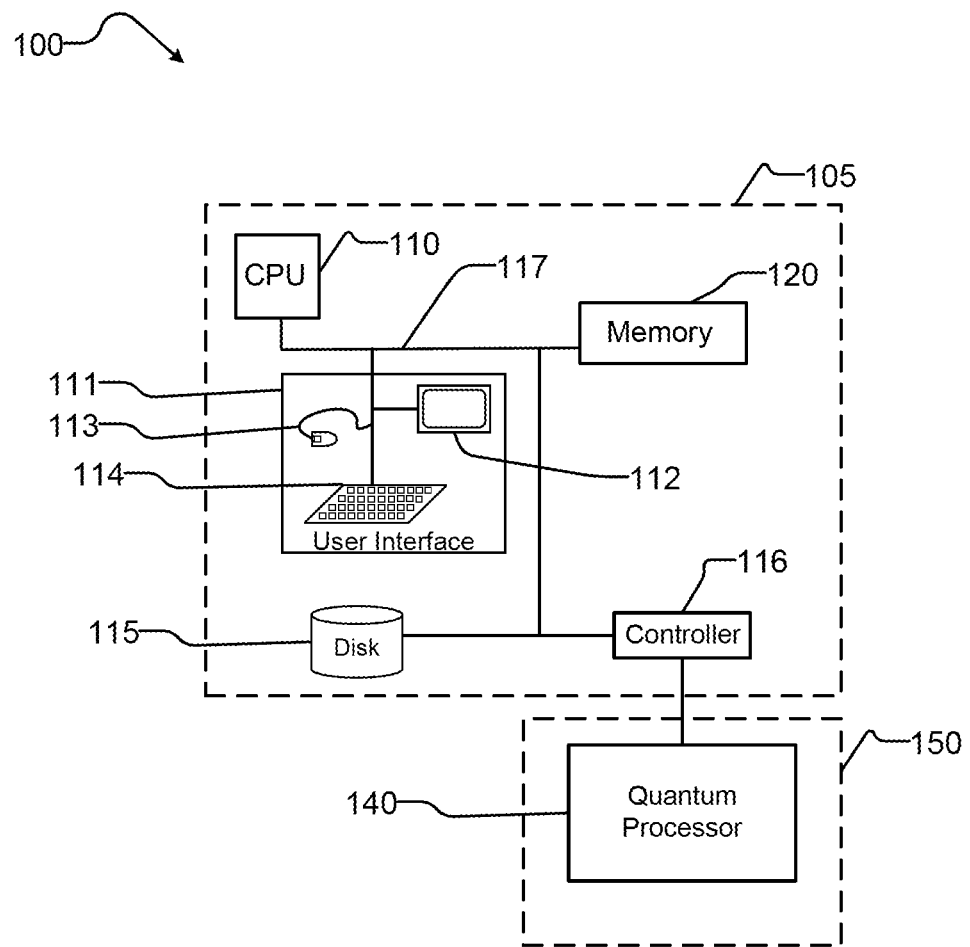
FIG. 1 is a schematic diagram of an exemplary hybrid computer including a digital computer and an analog computer in accordance with the present systems, devices, methods, and articles.

FIG. 1 illustrates a hybrid computing system 100 including a digital computer 105 coupled to an analog computer 150. In some implementations analog computer 150 is a quantum processor. The exemplary digital computer 105 includes a digital processor (CPU) 110 that may be used to perform classical digital processing tasks.

Digital computer 105 may include at least one digital processor (such as central processor unit 110 with one or more cores), at least one system memory 120, and at least one system bus 117 that couples various system components, including system memory 120 to central processor unit 110.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

Unless described otherwise, the construction and operation of the various blocks shown in FIG. 1 are of conventional design. As a result, such blocks need not be described in further detail herein, as they will be understood by those skilled in the relevant art.

Digital computer 105 may include a user input/output subsystem 111. In some implementations, the user input/output subsystem includes one or more user input/output components such as a display 112, mouse 113, and/or keyboard 114.

System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown).

Digital computer 105 may also include other non-transitory computer- or processor-readable storage media or non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for processor- or computer-readable instructions, data structures, or other data (sometimes called program modules) for digital computer 105.

Although digital computer 105 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 120. For example, system memory 120 may store instruction for communicating with remote clients and scheduling use of resources including resources on the digital computer 105 and analog computer 150. Also for example, system memory 120 may store at least one of processor executable instructions or data that, when executed by at least one processor, causes the at least one processor to execute the various algorithms described elsewhere herein, including machine learning related algorithms.

In some implementations system memory 120 may store processor- or computer-readable calculation instructions to perform pre-processing, co-processing, and post-processing to analog computer 150. System memory 120 may store at set of analog computer interface instructions to interact with analog computer 150.

Analog computer 150 may include at least one analog processor such as quantum processor 140. Analog computer 150 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1° Kelvin.

Figure 2A:
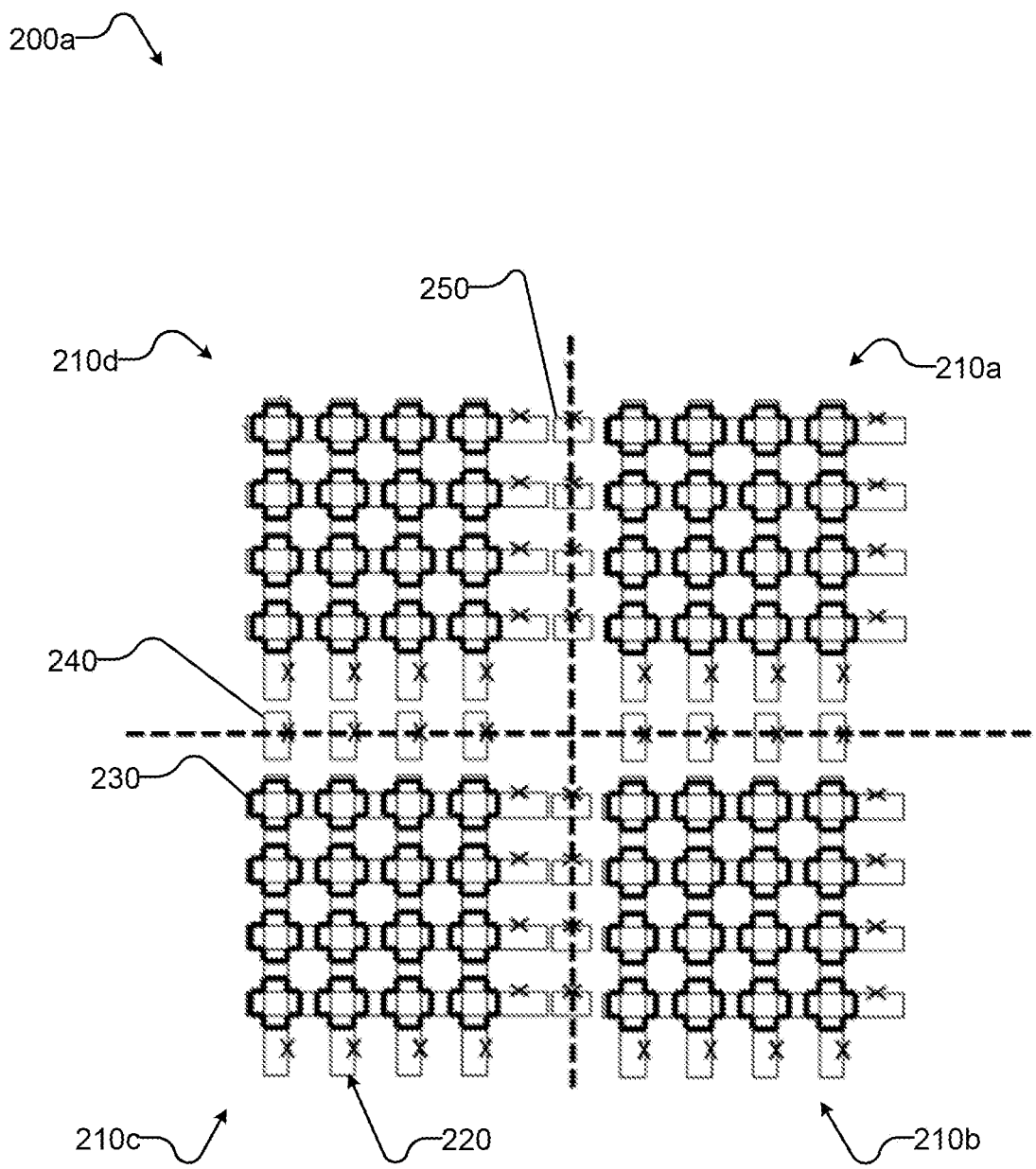
FIG. 2A is a schematic diagram of an exemplary topology for a quantum processor.

FIG. 2A shows an exemplary topology 200a for a quantum processor, in accordance with the presently described systems, devices, articles, and methods. Topology 200a may be used to implement quantum processor 140 of FIG. 1, however other topologies can also be used for the systems and methods of the present disclosure. Topology 200a comprises a grid of 2×2 cells 210a-210d, each cell comprised of 8 qubits such as qubit 220 (only one called out in FIG. 2A).

Within each cell 210a-210d, there are eight qubits 220 (only one called out for drawing clarity), the qubits 220 in each cell 210a-210d arranged four rows (extending horizontally in drawing sheet) and four columns (extending vertically in drawing sheet). Pairs of qubits 220 from the rows and columns can be communicatively coupled to one another by a respective coupler such as coupler 230 (illustrated by bold cross shapes, only one called out in FIG. 2A). A respective coupler 230 is positioned and operable to communicatively couple the qubit in each column (vertically-oriented qubit in drawing sheet) in each cell to the qubits in each row (horizontally-oriented qubit in drawing sheet) in the same cell. Additionally, a respective coupler, such as coupler 240 (only one called out in FIG. 2A) is positioned and operable to communicatively couple the qubit in each column (vertically-oriented qubit in drawing sheet) in each cell with a corresponding qubit in each column (vertically-oriented qubit in drawing sheet) in a nearest neighboring cell in a same direction as the orientation of the columns. Similarly, a respective coupler, such as coupler 250 (only one called out in FIG. 2A) is positioned and operable to communicatively couple the qubit in each row (horizontally-oriented qubit in drawing sheet) in each cell with a corresponding qubit in each row (horizontally-oriented qubit in drawing sheet) in each nearest neighboring cell in a same direction as the orientation of the rows. Since the couplers 240, 250 couple qubits 220 between cells 210 such couplers 240, 250 may at times be denominated as inter-cell couplers. Since the couplers 230 couple qubits within a cell 210, such couplers 230 may at times be denominated as intra-cell couplers.

Figure 2B:
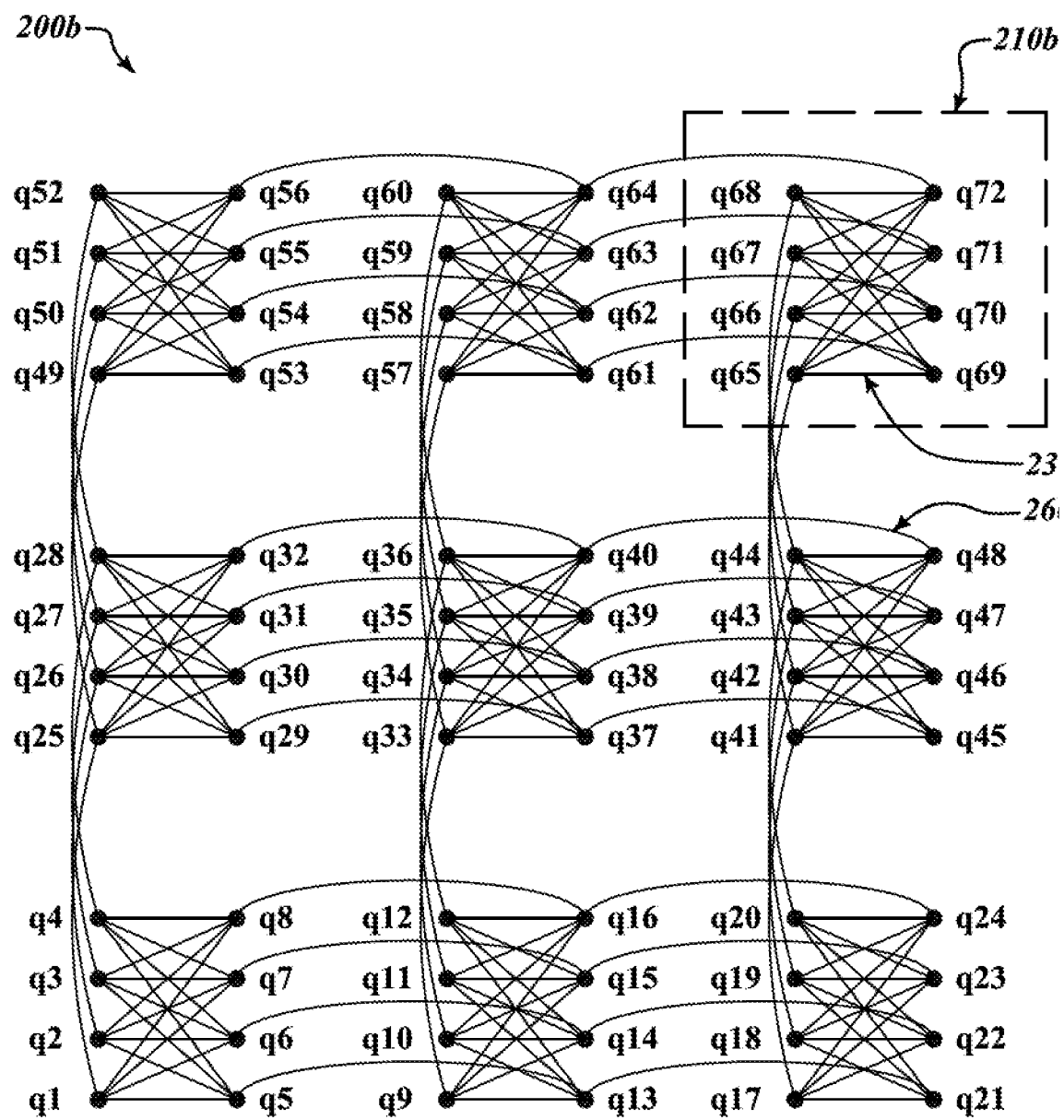
FIG. 2B is a schematic diagram showing a close-up of the exemplary topology for a quantum processor.

FIG. 2B shows an exemplary topology 200b for a quantum processor, in accordance with the presently described systems, devices, articles, and methods. Topology 200b shows nine cells, such as cell 210b (only one called out in FIG. 2B), each cell comprising eight qubits q1 through q72. FIG. 2B illustrates the intra-coupling, such as coupler 230b (only one called out in FIG. 2B), and inter-coupling, such as coupler 260 (only one called out in FIG. 2B), for the cell 210b.

The non-planarity of the connections between qubits q1-q72 makes the problem of finding the lowest energy state of the qubits q1-q72 an NP-hard problem, which means that it is possible to map many practical problems to the topology illustrated in FIGS. 2A and 2B, and described above.

Use of the quantum processor 140 with the topology illustrated in FIGS. 2A and 2B is not limited only to problems that fit the native topology. For example, it is possible to embed a complete graph of size N on a quantum processor of size $O(N^2)$ by chaining qubits together.

A computational system 100 (FIG. 1) comprising a quantum processor 140 with topology 200a of FIG. 2A or topology 200b of FIG. 2B can specify an energy function over spin variables +1/−1, and receive from the quantum processor with topology 200a or topology 200b samples of lower energy spin configurations in an approximately Boltzmann distribution according to the Ising model as follows:

$$E(s) = \sum_i h_i s_i + \sum_{i,j} J_{i,j} s_i s_j$$

where $h_i$ are local biases and $J_{i,j}$ are coupling terms.

The spin variables can be mapped to binary variables 0/1. Higher-order energy functions can be expressed by introducing additional constraints over auxiliary variables.

Machine Learning

Various systems and methods for augmenting conventional machine learning hardware such as Graphics Processing Units (GPUs) and Central Processing Units (CPUs) with quantum hardware are described herein. Quantum hardware typically includes one or more quantum processors or quantum processing units (QPUs). The systems and methods described herein adapt machine learning architectures and methods to exploit QPUs to advantageously achieve improved machine performance. Improved machine performance typically includes reduced training time and/or increased generalization accuracy.

Optimization and sampling can be computational bottlenecks in machine learning systems and methods. The systems and methods described herein integrate the QPU into the machine learning pipeline (including the architecture and methods) to perform optimization and/or sampling with improved performance over classical hardware. The machine learning pipeline can be modified to suit QPUs that can be realized in practice.

Sampling in Training Probabilistic Models

Boltzmann machines including restricted Boltzmann machines (RBMs) can be used in deep learning systems. Boltzmann machines are particularly suitable for unsupervised learning and probabilistic modeling such as in-painting and classification.

A shortcoming of existing approaches is that Boltzmann machines typically use costly Markov Chain Monte Carlo (MCMC) techniques to approximate samples drawn from an empirical distribution. The existing approaches serve as a proxy for a physical Boltzmann sampler.

A QPU can be integrated into machine learning systems and methods to reduce the time taken to perform training. For example, the QPU can be used as a physical Boltzmann sampler. The approach involves programming the QPU (which is an Ising system) such that the spin configurations realize a user-defined Boltzmann distribution natively. The approach can then draw samples directly from the QPU.

Restricted Boltzmann Machine (RBM)

The restricted Boltzmann machine (RBM) is a probabilistic graphical model that represents a joint probability distribution p(x,z) over binary visible units x and binary hidden units z. The restricted Boltzmann machine can be used as an element in a deep learning network.

The RBM network has the topology of a bipartite graph with biases on each visible unit and on each hidden unit, and weights (couplings) on each edge. An energy E(x,z) can be associated with the joint probability distribution p(x,z) over the visible and the hidden units, as follows:

$$p(x,z) = e^{-E(x,z)}/Z$$

where Z is the partition function.

For a restricted Boltzmann machine, the energy is:

$$E(x,z) = -b^T \cdot x - c^T \cdot z - z^T \cdot W \cdot x$$

where b and c are bias terms expressed as matrices, W is a coupling term expressed as a matrix, and T denotes the transpose of a matrix. The conditional probabilities can be computed:

$$p(x|z) = \sigma(b + W^T \cdot z)$$

$$p(z|x) = \sigma(c + W^T \cdot x)$$

where σ is the sigmoid function, used to ensure the values of the conditional probabilities lie in the range [0,1].

Training RBMs

Training is the process by which the parameters of the model are adjusted to favor producing the desired training distribution. Typically, this is done by maximizing of the observed data distribution with respect to the model parameters. One part of the process involves sampling over the given data distribution, and this part is generally straightforward. Another part of the process involves sampling over the predicted model distribution, and this is generally intractable, in the sense that it would use unmanageable amounts of computational resources.

Some existing approaches use a Markov Chain Monte Carlo (MCMC) method to perform sampling. MCMC constructs a Markov chain that has the desired distribution as its equilibrium distribution. The state of the chain after k>>1 steps is used as a sample of the desired distribution. The quality of the sample improves as a function of the number of steps which means that MCMC makes training a slow process.

To speed up the MCMC process, Contrastive Divergence-k (CD-k) can be used, in which the method only takes k steps of the MCMC process. Another way to speed up the process is to use Persistent Contrastive Divergence (PCD), in which a Markov Chain is initialized in the state where it ended from the previous model. CD-k and PCD methods tend to perform poorly when the distribution is multi-modal and the modes are separated by regions of low probability.

Even approximate sampling is NP-hard. The cost of sampling grows exponentially with problem size. Samples drawn from a native QPU network (as described above) are close to a Boltzmann distribution. It is possible to quantify the rate of convergence to a true Boltzmann distribution by evaluating the KL-divergence between the empirical distribution and the true distribution as a function of the number of samples.

Noise limits the precision with which the parameters of the model can be set in the quantum hardware. In practice, this means that the QPU is sampling from a slightly different energy function. The effects can be mitigated by sampling from the QPU and using the samples as starting points for non-quantum post-processing e.g., to initialize MCMC, CD, and PCD. The QPU is performing the hard part of the sampling process. The QPU finds a diverse set of valleys, and the post-processing operation samples within the valleys. Post-processing can be implemented in a GPU and can be at least partially overlapped with sampling in the quantum processor to reduce the impact of post-processing on the overall timing.

Sampling to Train RBMs

A training data set can comprise a set of visible vectors. Training comprises adjusting the model parameters such that the model is most likely to reproduce the distribution of the training set. Typically, training comprises maximizing the log-likelihood of the observed data distribution with respect to the model parameters θ:

$$\frac{\partial \log\left(\sum_z p(x, z)\right)}{\partial \theta} = -\left\langle \frac{\partial E(x, z)}{\partial \theta} \right\rangle_{p(z|x)} + \left\langle \frac{\partial E(x, z)}{\partial \theta} \right\rangle_{p(x|z)}$$

The first term on the right-hand side (RHS) in the above equation is related to the positive phase and computes an expected value of energy E over p(z|x). The term involves sampling over the given data distribution.

The second term on the RHS is related to the negative phase, and computes an expected value of energy, over p(x|z). The term involves sampling over the predicted model distribution.

Variational Auto-Encoder

Unsupervised learning of probabilistic models is a technique for machine learning. It can facilitate tasks such as denoising to extract a signal from a mixture of signal and noise, and inpainting to reconstruct lost or corrupted parts of an image. It can also regularize supervised tasks such as classification.

One approach to unsupervised learning can include attempting to maximize the log-likelihood of an observed dataset under a probabilistic model. Equivalently, unsupervised learning can include attempting to minimize the KL-divergence from the data distribution to that of the model. While the exact gradient of the log-likelihood function is frequently intractable, stochastic approximations can be computed, provided samples can be drawn from the probabilistic model and its posterior distribution given the observed data.

The efficiency of using stochastic approximations to arrive at a maximum of the log-likelihood function can be limited by the poor availability of desirable distributions for which the requisite sampling operations are computationally efficient. Hence, applicability of the techniques can be similarly limited.

Although sampling can be efficient in undirected graphical models provided there are no loops present among the connections, the range of representable relationships can be limited. Boltzmann machines (including restricted Boltzmann machines) can generate approximate samples using generally costly and inexact Markov Chain Monte Carlo (MCMC) techniques.

Sampling can be efficient in directed graphical models comprising a directed acyclic graph since sampling can be performed by an ancestral pass. Even so, it can be inefficient to compute the posterior distributions over the hidden causes of observed data in such models, and samples from the posterior distributions are required to compute the gradient of the log-likelihood function.

Another approach to unsupervised learning is to optimize a lower bound on the log-likelihood function. This approach can be more computationally efficient. An example of a lower bound is the evidence lower bound (ELBO) which differs from the true log-likelihood by the KL-divergence between an approximating posterior distribution, q(z|x,Ø), and the true posterior distribution, p(z|x,θ). The approximating posterior distribution can be designed to be computationally tractable even though the true posterior distribution is not computationally tractable. The ELBO can be expressed as follows:

$$\mathcal{L}(x, \theta, \phi) =$$

$$\log p(x|\theta) - KL[q(z|x,\theta)\|p(z|x,\theta)] = \int_z q(z|x,\phi) \log\left[\frac{p(x,z|\theta)}{q(z|x,\phi)}\right]$$

where x denotes the observed random variables, z the latent random variables, θ the parameters of the generative model and φ the parameters of the approximating posterior.

Successive optimization of the ELBO with respect to φ and θ is analogous to variational expectation-maximization (EM). It is generally possible to construct a stochastic approximation to gradient descent on the ELBO that only requires exact, computationally tractable samples. A drawback of this approach is that it can lead to high variance in the gradient estimate, and can result in slow training and poor performance.

The variational auto-encoder can regroup the ELBO as:

$$\mathcal{L}(x,\theta,\phi) = -KL[q(z|x,\phi)\|p(z|\theta)] + \mathbb{E}_q[\log p(x|z,\theta)].$$

The KL-divergence between the approximating posterior and the true prior is analytically simple and computationally efficient for commonly chosen distributions, such as Gaussians.

A low-variance stochastic approximation to the gradient of the auto-encoding term $\mathbb{E}_q$ can be backpropagated efficiently, so long as samples from the approximating posterior q(z|x) can be drawn using a differentiable, deterministic function $f(x,\phi,\rho)$ of the combination of the inputs x, the parameters φ, and a set of input- and parameter-independent random variables ρ~D. For instance, given a Gaussian distribution with mean m(x, φ) and variance v(x, φ) determined by the input, $\mathcal{N}(m(x,\phi), v(x,\phi))$, samples can be drawn using $$f(x,\phi,\rho) = m(x,\phi) + \sqrt{v(x,\phi)} \cdot \rho, \text{ where } \rho \sim \mathcal{N}(0,1).$$

When such an f(x,φ,ρ) exists, $$\mathbb{E}_{q(z|x,\phi)}[\log p(x|z,\theta)] = \mathbb{E}_\rho[\log p(x|f(x,\rho,\phi),\theta)] \quad (1)$$

$$\frac{\partial}{\partial \phi}\mathbb{E}_{q(z|x,\phi)}[\log p(x|z,\theta)] = \mathbb{E}_\rho\left[\frac{\partial}{\partial \phi}\log p(x|f(x,\rho,\phi),\theta)\right]$$

$$\approx \frac{1}{N}\sum_{\rho \sim D}\frac{\partial}{\partial \phi}\log p(x|f(x,\rho,\phi),\theta),$$

and the stochastic approximation to the derivative in equation 1 is analytically tractable so long as p(x|z, θ) and f(x, ρ, Ø) are defined so as to have tractable derivatives.

This approach is possible whenever the approximating posteriors for each hidden variable, $q_i(z_i|x, \phi)$, are independent given x and φ; the cumulative distribution function (CDF) of each $q_i$ is invertible; and the inverse CDF each $q_i$, is differentiable. Specifically, choose $\mathcal{D}$ to be the uniform distribution between 0 and 1, and $f_i$ to be the inverse CDF of $q_i$.

The conditional marginal cumulative distribution (CDF) is defined by $$F_i(x) = \int_{x_i'=-\infty}^{x} p(x_i' | x_1, \ldots, x_{i-1})$$

Since the approximating posterior distribution $q(z|x, \phi)$ maps each input to a distribution over the latent space, it is called the "encoder". Correspondingly, since the conditional likelihood distribution $p(x|z, \theta)$ maps each configuration of the latent variables to a distribution over the input space, it is called the "decoder".

Unfortunately, a multivariate CDF is generally not invertible. One way to deal with this is to define a set of CDFs as follows:

$$F_i(x) = \int_{x_i'=-\infty}^{x} p(x_i' | x_1, \ldots, x_{i-1})$$

and invert each conditional CDF in turn. The CDF $F_i(x)$ is the CDF of $x_i$ conditioned on all $x_j$ where $j<i$, and marginalized over all $x_k$ where $i<k$. Such inverses generally exist provided the conditional-marginal probabilities are everywhere non-zero.

Discrete Variational Auto-Encoders

The approach can run into challenges with discrete distributions, such as, for example, Restricted Boltzmann Machines (RBMs). An approximating posterior that only assigns non-zero probability to a discrete domain corresponds to a CDF that is piecewise-constant. That is, the range of the CDF is a proper subset of the interval [0, 1]. The domain of the inverse CDF is thus also a proper subset of the interval [0, 1] and its derivative is generally not defined.

The difficulty can remain even if a quantile function as follows is used:

$$F_p^{-1}(\rho) = \inf\{z \in \mathbb{R} : \int_{z'=-\infty}^{z} p(z') \geq \rho\}$$

The derivative of the quantile function is either zero or infinite for a discrete distribution.

One method for discrete distributions is to use a reinforcement learning method such as REINFORCE (Williams, http://www-anw.cs.umass.edu/~barto/courses/cs687/williams92simple.pdf). The REINFORCE method adjust weights following receipt of a reinforcement value by an amount proportional to the difference between a reinforcement baseline and the reinforcement value. Rather than differentiating the conditional log-likelihood directly in REINFORCE, the gradient of the log of the conditional likelihood distribution is estimated, in effect, by a finite difference approximation. The conditional log-likelihood log $p(x|z, \theta)$ is evaluated at many different points $z \sim q(z|x, \phi)$, and the gradient $$\frac{\partial}{\partial \phi} \log q((z | x, \phi)$$

weighted more strongly when $p(x|z, \theta)$ differs more greatly from the baseline.

One disadvantage is that the change of $p(x|z, \theta)$ in a given direction can only affect the REINFORCE gradient estimate if a sample is taken with a component in the same direction. In a D-dimensional latent space, at least D samples are required to capture the variation of the conditional distribution $p(x|z, \theta)$ in all directions. Since the latent representation can typically consist of hundreds of variables, the REINFORCE gradient estimate can be much less efficient than one that makes more direct use of the gradient of the conditional distribution $p(x|z, \theta)$.

A discrete variational auto-encoder (DVAE) is a hierarchical probabilistic model consisting of an RBM, followed by multiple layers of continuous latent variables, allowing the binary variables to be marginalized out, and the gradient to backpropagate smoothly through the auto-encoding component of the ELBO.

The generative model is redefined so that the conditional distribution of the observed variables given the latent variables only depends on the new continuous latent space.

A discrete distribution is thereby transformed into a mixture distribution over this new continuous latent space. This does not alter the fundamental form of the model, nor the KL-divergence term of the ELBO; rather it adds a stochastic component to the approximating posterior and the prior.

One interpretation of the way that VAEs work is that they break the encoder distribution into "packets" of probability, each packet having infinitesimal but equal probability mass. Within each packet, the values of the latent variables are approximately constant. The packets correspond to a region in the latent space, and the expectation value is taken over the packets. There are generally more packets in regions of high probability, so more probable values are more likely to be selected.

As the parameters of the encoder are changed, the location of each packet can move, while its probability mass stays constant. So long as $F_{q(z|x, \phi)}^{-1}$ exists and is differentiable, a small change in will correspond to a small change in the location of each packet. This allows the use of the gradient of the decoder to estimate the change in the loss function, since the gradient of the decoder captures the effect of small changes in the location of a selected packet in the latent space.

In contrast, REINFORCE works by breaking the latent representation into segments of infinitesimal but equal volume, within which the latent variables are also approximately constant, while the probability mass varies between segments. Once a segment is selected in the latent space, its location is independent of the parameters of the encoder. As a result, the contribution of the selected location to the loss function is not dependent on the gradient of the decoder. On the other hand, the probability mass assigned to the region in the latent space around the selected location is relevant.

Though VAEs can make use of gradient information from the decoder, the gradient estimate is generally only low-variance provided the motion of most probability packets has a similar effect on the loss function. This is likely to be the case when the packets are tightly clustered (e.g., if the encoder produces a Gaussian distribution with low variance) or if the movements of well-separated packets have a similar effect on the loss function (e.g., if the decoder is roughly linear).

One difficulty is that VAEs cannot generally be used directly with discrete latent representations because changing the parameters of a discrete encoder moves probability mass between the allowed discrete values, and the allowed discrete values are generally far apart. As the encoder parameters change, a selected packet either remains in place or jumps more than an infinitesimal distance to an allowed discrete value. Consequently, small changes to the parameters of the encoder do not affect most of the probability packets. Even when a packet jumps between discrete values of the latent representation, the gradient of the decoder generally cannot be used to estimate the change in loss function accurately, because the gradient generally captures only the effects of very small movements of the probability packet.

Therefore, to use discrete latent representations in the VAE framework, the method described herein for unsupervised learning transforms the distributions to a continuous latent space within which the probability packets move smoothly. The encoder $q(z|x,\emptyset)$ and prior distribution $p(z|\theta)$ are extended by a transformation to a continuous, auxiliary latent representation $\zeta$, and the decoder is correspondingly transformed to be a function of the continuous representation. By extending the encoder and the prior distribution in the same way, the remaining KL-divergence (referred to above) is unaffected.

In the transformation, one approach maps each point in the discrete latent space to a non-zero probability over the entire auxiliary continuous space. In so doing, if the probability at a point in the discrete latent space increases from zero to a non-zero value, a probability packet does not have to jump a large distance to cover the resulting region in the auxiliary continuous space. Moreover, it ensures that the CDFs $F_i(x)$ are strictly increasing as a function of their main argument, and thus are invertible.

The method described herein for unsupervised learning smooths the conditional-marginal CDF $F_i(x)$ of an approximating posterior distribution, and renders the distribution invertible, and its inverse differentiable, by augmenting the latent discrete representation with a set of continuous random variables. The generative model is redefined so that the conditional distribution of the observed variables given the latent variables only depends on the new continuous latent space.

The discrete distribution is thereby transformed into a mixture distribution over the continuous latent space, each value of each discrete random variable associated with a distinct mixture component on the continuous expansion. This does not alter the fundamental form of the model, nor the KL-divergence term of the ELBO; rather it adds a stochastic component to the approximating posterior and the prior.

The method augments the latent representation with continuous random variables $\zeta$, conditioned on z, as follows:

$$q(\zeta,z|x,\phi)=r(\zeta|x)\cdot q(z|x,\phi)$$

where the support of $r(\zeta|x)$ for all values of z is connected, so the marginal distribution $q(\zeta|x, \phi)=\Sigma_z r(\zeta|z)\cdot q(z|x, \phi)$ has a constant, connected support so long as $0<q(z|x,\phi)<1$. The approximating posterior $r(\zeta|x)$ is continuous and differentiable except at the end points of its support so that the inverse conditional-marginal CDF is differentiable.

Figure 3:
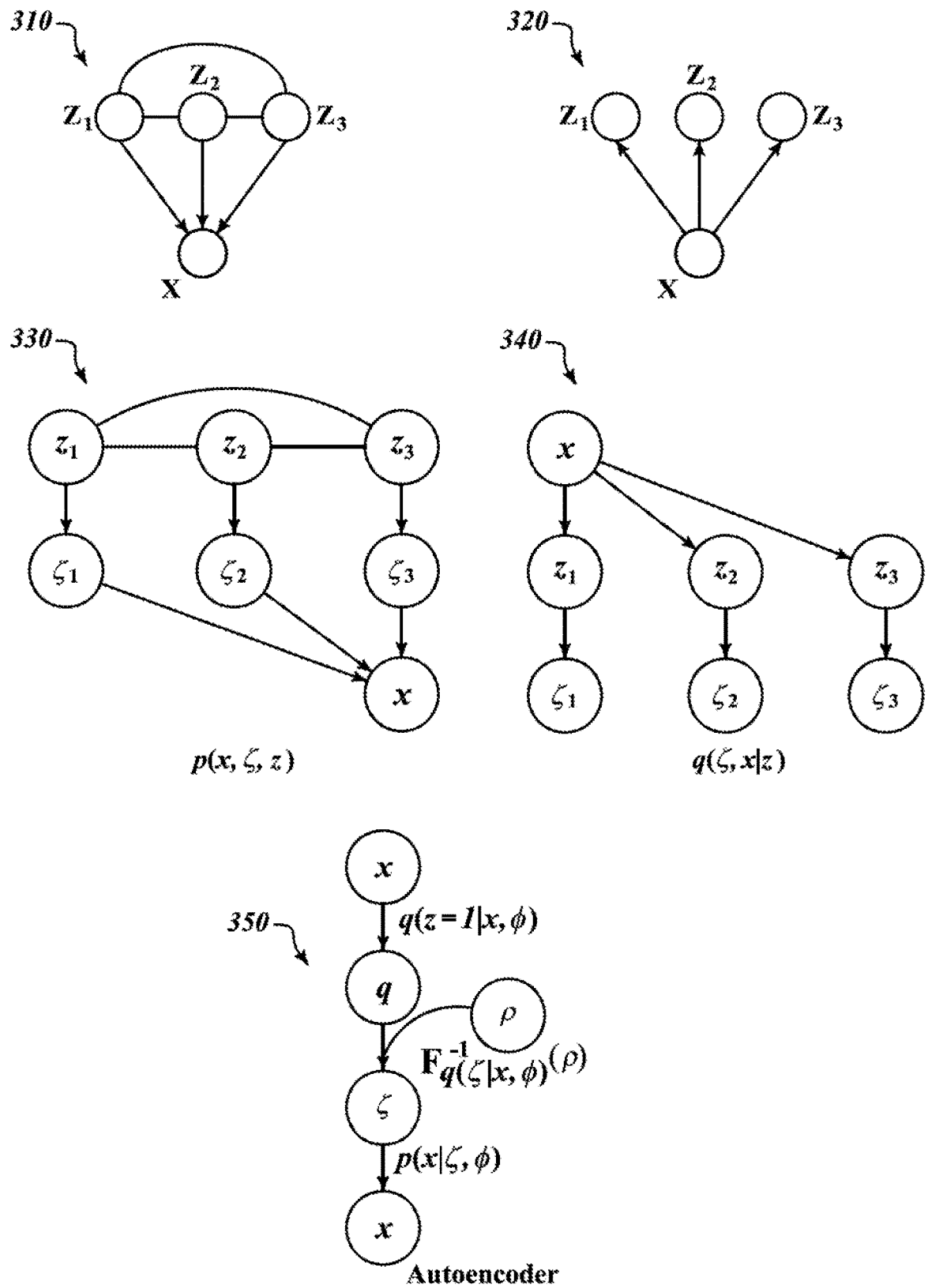
FIG. 3 is a schematic diagram illustrating an example implementation of a variational auto-encoder (VAE).

FIG. 3 shows an example implementation of a VAE. The variable z is a latent variable. The variable x is a visible variable (for example, pixels in an image data set). The variable $\zeta$ is a continuous variable conditioned on a discrete z as described above in the present disclosure. The variable $\zeta$ can serve to smooth out the discrete random variables in the auto-encoder term. As described above, the variable $\zeta$ generally does not directly affect the KL-divergence between the approximating posterior and the true prior.

In the example, the variables $z_1$, $z_2$, and $z_3$ are disjoint subsets of qubits in the quantum processor. The computational system samples from the RBM using the quantum processor. The computational system generates the hierarchical approximating posteriors using a digital (classical) computer. The computational system uses priors 310 and 330, and hierarchical approximating posteriors 320 and 340.

For the prior 330 and the approximating posterior 340, the systems adds continuous variables $\zeta_1$, $\zeta_2$, $\zeta_3$ below the latent variables $z_1$, $z_2$, $z_3$.

FIG. 3 also shows the auto-encoding loop 350 of the VAE. Initially, input x is passed into a deterministic feedforward network $q(z=1|x, \emptyset)$, for which the final non-linearity is the logistic function. Its output q, along with independent random variable $\rho$, is passed into the deterministic function $F_{q(\zeta|x,\emptyset)}^{-1}$ to produce a sample of $\zeta$. This $\zeta$, along with the original input x, is finally passed to $\log p(x|\zeta,\theta)$. The expectation of this log probability with respect to $\rho$ is the auto-encoding term of the VAE. This auto-encoder, conditioned on the input and the independent $\rho$, is deterministic and differentiable, so backpropagation can be used to produce a low-variance, computationally efficient approximation to the gradient.

The distribution remains continuous as $q(z|x, \phi)$ changes. The distribution is also everywhere non-zero in the approach that maps each point in the discrete latent space to a non-zero probability over the entire auxiliary continuous space. Correspondingly, $p(\zeta, z|\theta)$ is defined as $p(\zeta,z|\theta)=r(\zeta|z)\cdot p(z|\theta)$, where $r(\zeta|z)$ is the same as for the approximating posterior, and $p(x|\zeta, z, \theta)=p(x|\zeta, \theta)$. This transformation renders the model a continuous distribution over z.

The method described herein can generate low-variance stochastic approximations to the gradient. The KL-divergence between the approximating posterior and the true prior distribution is unaffected by the introduction of auxiliary continuous latent variables, provided the same expansion is used for both.

The auto-encoder portion of the loss function is evaluated in the space of continuous random variables, and the KL-divergence portion of the loss function is evaluated in the discrete space.

The KL-divergence portion of the loss function is as follows:

$$-KL[q(z|x,\phi) \| p(z|\theta)] = \sum_z q(z|x,\phi)\cdot[\log p(z|\theta) - \log q(z|x,\phi)]$$

The gradient of the KL-divergence portion of the loss function in the above equation with respect to $\theta$ can be estimated stochastically using samples from the true prior distribution $p(z|\theta)$. The gradient of the KL-divergence portion of the lost function can be expressed as follows:

$$\frac{\partial KL(q\|p)}{\partial \theta} = -\left\langle\frac{\partial E_p(z|\theta)}{\partial \theta}\right\rangle_{q(z|x,\phi)} + \left\langle\frac{\partial E_p(z|\theta)}{\partial \theta}\right\rangle_{p(z|\theta)}$$

In one approach, the method computes the gradients of the KL-divergence portion of the loss function analytically, for example by first directly parameterizing a factorial $q(z|x,\phi)$ with a deep network $g(x)$:

$$q(z|x,\phi) = \frac{e^{-E_q(z|x,\phi)}}{\sum_{z'} e^{-E_q(z'|x,\phi)}}$$

where $E_q(z|x) = -g(x)^T \cdot z$ and then using the following expression:

$$\frac{\partial KL(q \| p)}{\partial \phi} = \left( (g(x) - h - (J^T + J) \cdot \langle z \rangle_q)^T \odot (\langle z \rangle_q - \langle z \rangle_q^2)^T \right) \cdot \frac{\partial g(x)}{\partial \phi}$$

Equation 1 can therefore be simplified by dropping the dependence of p on z and then marginalizing z out of q, as follows:

$$\frac{\partial}{\partial \phi} \mathbb{E}_{q(\zeta,z|x,\phi)}[\log p(x | \zeta, z, \theta)] \approx \frac{1}{N} \sum_{\rho \sim U(0,1)^n} \frac{\partial}{\partial \phi} \log p(x | \zeta(\rho), \theta) \Big|_{\zeta = \zeta(\rho)} \quad (2)$$

An example of a transformation from the discrete latent space to a continuous latent space is the spike-and-slab transformation:

$$r(\zeta_i | z_i = 0) = \begin{cases} \infty, & \text{if } \zeta_i = 0 \\ 0, & \text{otherwise} \end{cases}$$

$$r(\zeta_i | z_i = 1) = \begin{cases} 1, & \text{if } 0 \leq \zeta_i \leq 1 \\ 0, & \text{otherwise} \end{cases}$$

This transformation is consistent with sparse coding.

Other expansions to the continuous space are also possible. As an example a combination of delta spike and exponential function can be used:

$$r(\zeta_i | z_i = 0) = \begin{cases} \infty, & \text{if } \zeta_i = 0 \\ 0, & \text{otherwise} \end{cases}$$

$$r(\zeta_i | z_i = 1) = \begin{cases} \frac{\beta e^{\beta \zeta}}{e^{\beta} - 1}, & \text{if } 0 \leq \zeta_i \leq 1 \\ 0, & \text{otherwise} \end{cases}$$

Alternatively, it is possible to define a transformation from discrete to continuous variables in the approximating posterior, $r(\zeta|z)$, where the transformation is not independent of the input x. In the true posterior distribution, $p(\zeta|z, x) \approx p(\zeta|z)$ only if z already captures most of the information about x and $p(\zeta|z, x)$ changes little as a function of x. In a case where it may be desirable for $g(\zeta_i|z_i, x, \phi)$ to be a separate Gaussian for both values of the binary $z_i$, it is possible to use a mixture of a delta spike and a Gaussian to define a transformation from the discrete to the continuous space for which the CDF can be inverted piecewise.

Figure 4:
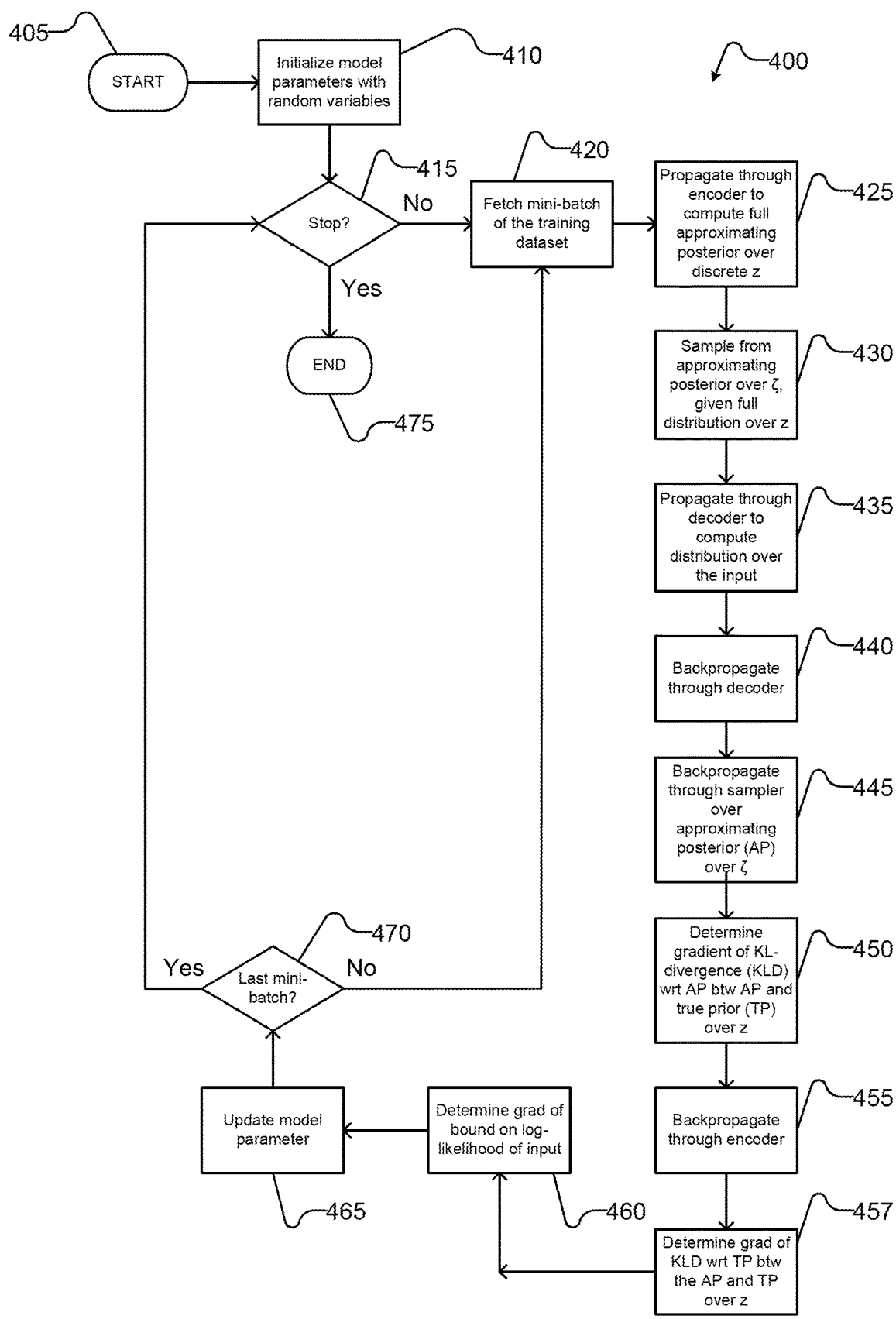
FIG. 4 is a flow chart illustrating a method for unsupervised learning, in accordance with the presently described systems, devices, articles, and methods.

FIG. 4 shows a method 400 of unsupervised learning using a discrete variational auto-encoder. Execution of the method 400 by one or more processor-based devices may occur in accordance with the present system, devices, articles, and methods. Method 400, like other methods herein may be implemented by a series or set of processor-readable instructions executed by one or more processors (i.e., hardware circuitry).

Method 400 starts at 405, for example in response to a call from another routine or other invocation.

At 410, the system initializes the model parameters with random values. Alternatively, the system can initialize the model parameters based on a pre-training procedure. At 415, the system tests to determine if a stopping criterion has been reached. The stopping criterion can, for example, be related to the number of epochs (i.e., passes through the dataset) or a measurement of performance between successive passes through a validation dataset. In the latter case, when performance beings to degrade, it is an indication that the system is over-fitting and should stop.

In response to determining the stopping criterion has been reached, the system ends method 400 at 475, until invoked again, for example, a request to repeat the learning.

In response to determining the stopping criterion has not been reached, the system fetches a mini-batch of the training data set at 420. At 425, the system propagates the training data set through the encoder to compute the full approximating posterior over discrete space z.

At 430, the system generates or causes generation of samples from the approximating posterior over ζ, given the full distribution over z. Typically, this is performed by a non-quantum processor, and uses the inverse of the CDF $F_i(x)$ described above. The non-quantum processor can, for example, take the form of one or more of one or more digital microprocessors, digital signal processors, graphical processing units, central processing units, digital application specific integrated circuits, digital field programmable gate arrays, digital microcontrollers, and/or any associated memories, registers or other nontransitory computer- or processor-readable media, communicatively coupled to the non-quantum processor.

At 435, the system propagates the samples through the decoder to compute the distribution over the input.

At 440, the system performs backpropagation through the decoder.

At 445, the system performs backpropagation through the sampler over the approximating posterior over ζ. In this context, backpropagation is an efficient computational approach to determining the gradient.

At 450, the system computes the gradient of the KL-divergence between the approximating posterior and the true prior over z. At 455, the system performs backpropagation through the encoder.

At 457, the system determines a gradient of a KL-divergence, with respect to parameters of the true prior distribution, between the approximating posterior and the true prior distribution over the discrete space.

At 460, the system determines at least one of a gradient or at least a stochastic approximation of a gradient, of a bound on the log-likelihood of the input data.

In some embodiments, the system generates samples or causes samples to be generated by a quantum processor. At 465, the system updates the model parameters based at least in part on the gradient.

At 470, the system tests to determine if the current mini-batch is the last mini-batch to be processed. In response to determining that the current mini-batch is the last mini-batch to be processed, the system returns control to 415. In response to determining that the current mini-batch is not the last mini-batch to be processed, the system returns control to 420.

In some implementations, act 470 is omitted, and control passes directly to 415 from 465. The decision whether to fetch another mini-batch can be incorporated in 415.

In summary, as described in more detail above, the discrete VAE method extends the encoder and the prior with a transformation to a continuous, auxiliary latent representation, and correspondingly makes the decoder a function of the same continuous representation. The method evaluates the auto-encoder portion of the loss function in the continuous representation while evaluating the KL-divergence portion of the loss function in the z space.

Accommodating Explaining-Away with a Hierarchical Approximating Posterior

When a probabilistic model is defined in terms of a prior distribution p(z) over latent variables z and a conditional distribution p(x|z) over observed variables x given the latent variables, the observation of x often induces strong correlations of the z, given x, in the posterior p(z|x) due to phenomena such as explaining-away, a pattern of reasoning where the confirmation of one cause reduces the need to search for alternative causes. Moreover, an RBM used as the prior distribution may have strong correlations between the units of the RBM.

To accommodate the strong correlations expected in the posterior distribution while maintaining tractability, hierarchy can be introduced into the approximating posterior q(z|x). Although the variables of each hierarchical layer are independent given the previous layers, the total distribution can capture strong correlations, especially as the size of each hierarchical layer shrinks towards a single variable.

The latent variables z of the RBM are divided into disjoint groups, $z_1, \ldots, z_k$. The continuous latent variables $\zeta$ are divided into complementary disjoint groups $\zeta_1, \ldots, \zeta_k$. In one implementations, the groups may be chosen at random, while in other implementations the groups be defined so as to be of equal size. The hierarchical variational auto-encoder defines the approximating posterior via a directed acyclic graphical model over these groups.

$$q(z_1, \zeta_1, \ldots, z_k, \zeta_k | x, \phi) =$$

$$\Pi_{1 \le j \le k} r(\zeta_j | z_j) \cdot q(z_j | \zeta_{i<j}, x, \phi) \text{ where } q(z_j | \zeta_{i<j}, x, \phi) =$$

$$\frac{e^{g_j(\zeta_{i<j}, x)^T \cdot z_j}}{\Pi_{z_L \in z_j}(1 + e^{g_{zL}(\zeta_{i<j}, x)})}$$

$z_j \in \{0,1\}$, and $g_j(\zeta_{i<j}, x, \emptyset)$ is a parameterized function of the input and preceding $\zeta_i$, such as a neural network. The corresponding graphical model is shown in FIG. 5.

Figure 5:
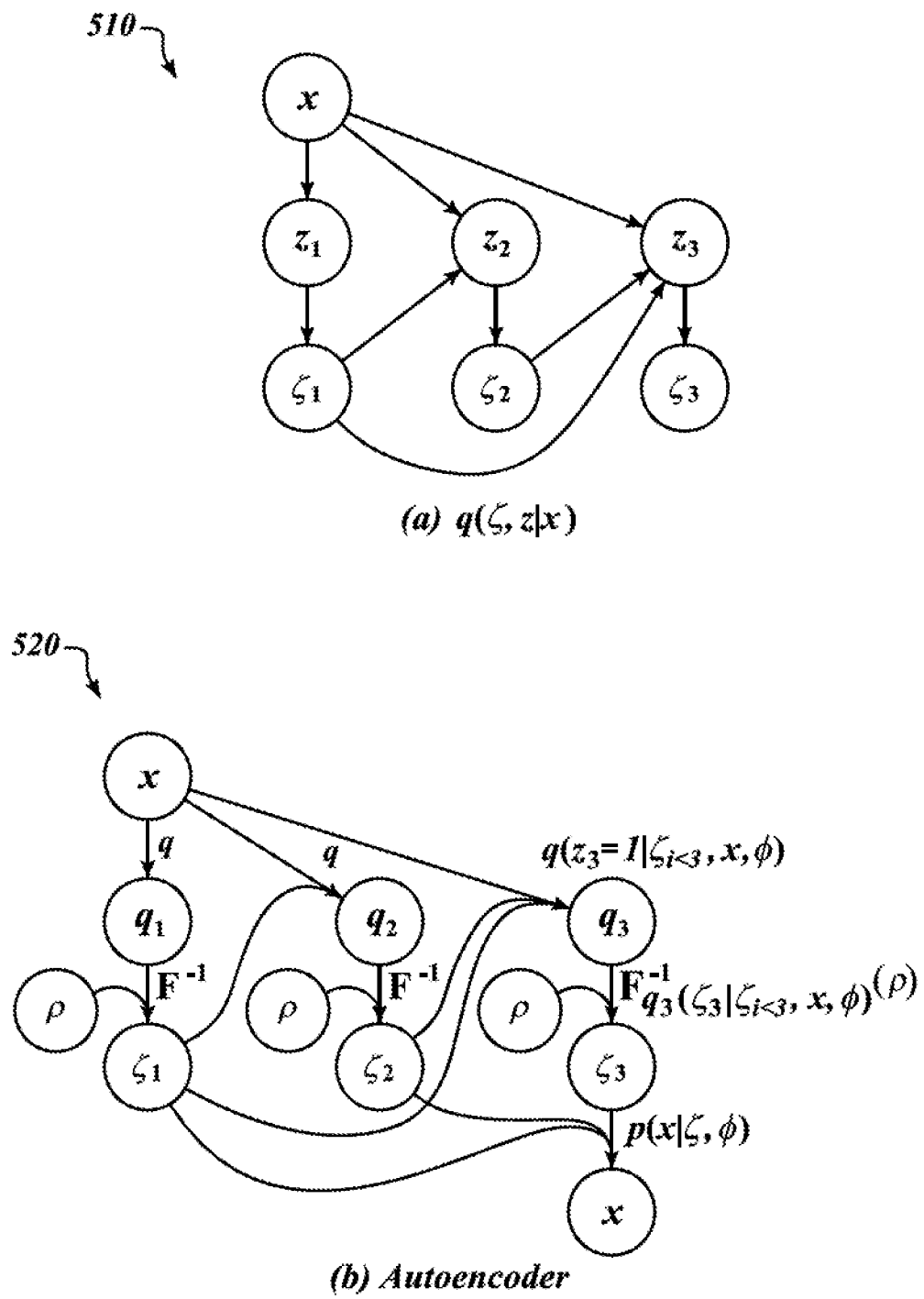
FIG. 5 is a schematic diagram illustrating an example implementation of a hierarchical variational auto-encoder (VAE).

FIG. 5 schematic diagram illustrating an example implementation of a hierarchical variational auto-encoder (VAE). The model uses approximating posterior 510, where latent variable $z_3$ is conditioned on the continuous variables $\zeta_2$ and $\zeta_1$, while $z_2$ is conditioned on $\zeta_1$.

The dependence of $z_j$ on the discrete variables $z_{i<j}$ is mediated by the continuous variables $\zeta_{i<j}$.

This hierarchical approximating posterior does not affect the form of the auto-encoding term 520 of FIG. 5, except to increase the depth of the auto-encoder. Each $\zeta_i$ can be computed via the stochastic nonlinearity $F_{q(\zeta_j|\zeta_{i<j}, x, \phi)}^{-1}(\rho)$, where the function $q_j$ can take previous $\zeta_{i<j}$ as input.

The deterministic probability value $q(z=1|\zeta_{i<j}, x, \emptyset)$ is parameterized, for example by a neural network.

For each successive layer j of the autoencoder, input x and all previous $\zeta_{i<j}$ are passed into the network computing $q(z=1|\zeta_{i<j}, x, \emptyset)$. Its output $q_j$, along with an independent random variable $\rho$ is passed into the deterministic function $F_{q(\zeta_{i<j}, x, \emptyset)}^{-1}(\rho)$ to produce a sample of $\zeta_j$. Once all $\zeta_j$ have been recursively computed, the full $\zeta$ along with the original input x is finally passed to log $p(x|\zeta, \theta)$.

The KL-divergence between the approximating posterior and the true prior is also not significantly affected by the introduction of additional continuous latent variables $\zeta$, so long as the approach uses the same expansion r($\zeta$|z) for both the approximating posterior and the prior, as follows:

$$KL[q \| p] = \sum_z \int_\zeta \left( \prod_{1 \le j \le k} r(\zeta_j | z_j) \cdot q(z_j | \zeta_{i<j}, x) \right) \cdot$$

$$\log \frac{\prod_{1 \le j \le k} r(\zeta_j | z_j) \cdot q(z_j | \zeta_{i<j}, x)}{p(z) \cdot \prod_{1 \le j \le k} r(\zeta_j | z_j)}$$

$$= \sum_z \int_\zeta \left( \prod_{1 \le j \le k} e(\zeta_j | z_j) \cdot q(z_j | \zeta_{i<j}, x) \right) \cdot \log \frac{\prod_{1 \le j \le k} q(z_j | \zeta_{i<j}, x)}{p(z)}$$

The gradient of the KL-divergence with respect to the parameter $\theta$ of the prior $p(z|\theta)$ can be estimated stochastically using samples from the approximating posterior $q(\zeta, z|x, \phi)$ and the true prior $p(z|\theta)$. The prior can be, for example, an RBM.

The final expectation with respect to $q(z_k|\zeta_{i<j}, x, \phi)$ can be performed analytically; all other expectations require samples from the approximating posterior. Similarly, the prior requires samples from, for example, an RBM.

Samples from the same prior distribution are required for an entire mini-batch, independent from the samples chosen from the training dataset.

Hierarchical Variational Auto-Encoders

Convolutional architectures are an essential component of state-of-the-art approaches to visual object classification, speech recognition, and numerous other tasks. In particular, they have been successfully applied to generative modeling, such as in deconvolutional networks and LAPGAN. There is, therefore, technical benefit in incorporating convolutional architectures into variational auto-encoders, as such can provide a technical solution to a technical problem, and thereby achieve a technical result.

Convolutional architectures are necessarily hierarchical. In the feedforward direction, they build from local, high-resolution features to global, low-resolution features through the application of successive layers of convolution, point-wise nonlinear transformations, and pooling. When used generatively, this process is reversed, with global, low-resolution features building towards local, high-resolution features through successive layers of deconvolution, point-wise nonlinear transformations, and unpooling.

Incorporating this architecture into the variational auto-encoder framework, it is natural to associate the upward pathway (from local to global) with the approximating posterior, and the downward pathway (from global to local) with the generative model. However, if the random variables of the generative model are defined to be the units of the deconvolutional network itself, then samples from the approximating posterior of the last hidden layer of the deconvolutional decoder can be determined directly by the convolutional encoder. In particular, it can be natural to define the samples from the last layer of the deconvolutional decoder to be a function solely of the first layer of the convolutional encoder. As a result, the auto-encoding component of the VAE parameter update depends on the bottom-most layer of random variables. This seems contradictory to the intuitive structure of a convolutional auto-encoder.

Instead, ancillary random variables can be defined at each layer of the deconvolutional decoder network. Ancillary random variables can be discrete random variables or continuous random variables.

In the deconvolutional decoder, the ancillary random variables of layer n are used in conjunction with the signal from layer n+1 to determine the signal to layer n−1. The approximating posterior over the ancillary random variables of layer n is defined to be a function of the convolutional encoder, generally restricted to layer n of the convolutional encoder. To compute a stochastic approximation to the gradient of the evidence lower bound, to the approach can perform a single pass up the convolutional encoder network, followed by a single pass down the deconvolutional decoder network. In the pass down the deconvolutional decoder network, the ancillary random variables are sampled from the approximating posteriors computed in the pass up the convolutional encoder network.

A Problem with the Traditional Approach

A traditional approach can result in approximating posteriors that poorly match the true posterior, and consequently can result in poor samples in the auto-encoding loop. In particular, the approximating posterior defines independent distributions over each layer. This product of independent distributions ignores the strong correlations between adjacent layers in the true posterior, conditioned on the underlying data.

The representation throughout layer n should be mutually consistent, and consistent with the representation in layer n−1 and n+1. However, in the architecture described above, the approximating posterior over every random variable is independent. In particular, the variability in the higher (more abstract) layers is uncorrelated with that in the lower layers, and consistency cannot be enforced across layers unless the approximating posterior collapses to a single point.

This problem is apparent in the case of (hierarchical) sparse coding. At every layer, the true posterior has many modes, constrained by long-range correlations within each layer. For instance, if a line in an input image is decomposed into a succession of short line segments (e.g., Gabor filters), it is essential that the end of one segment line up with the beginning of the next segment. With a sufficiently overcomplete dictionary, there may be many sets of segments that cover the line, but differ by a small offset along the line. A factorial posterior can reliably represent one such mode.

These equivalent representations can be disambiguated by the successive layers of the representation. For instance, a single random variable at a higher layer may specify the offset of all the line segments in the previous example. In the traditional approach, the approximating posteriors of the (potentially disambiguating) higher layers are computed after approximating posteriors of the lower layers have been computed. In contrast, an efficient hierarchical variational auto-encoder could infer the approximating posterior over the top-most layer first, potentially using a deep, convolutional computation. It would then compute the conditional approximating posteriors of lower layers given a sample from the approximating posterior of the higher layers.

A Proposed Approach—Hierarchical Priors and Approximating Posteriors

In the present approach, rather than defining the approximating posterior to be fully factorial, the computational system conditions the approximating posterior for the $n^{th}$ layer on the sample from the approximating posterior of the higher layers preceding it in the downward pass through the deconvolutional decoder. In an example case, the computational system conditions the approximating posterior for the $n^{th}$ layer on the sample from the $(n-1)^{th}$ layer. This corresponds to a directed graphical model, flowing from the higher, more abstract layers to the lower, more concrete layers. Consistency between the approximating posterior distributions over each pair of layers is ensured directly.

With such a directed approximating posterior, it is possible to do away with ancillary random variables, and define the distribution directly over the primary units of the deconvolutional network. In this case, the system can use a parameterized distribution for the deconvolutional component of the approximating posterior that shares structure and parameters with the generative model. Alternatively, the system can continue to use a separately parameterized directed model.

In the example case and other cases, a stochastic approximation to the gradient of the evidence lower bound can be computed via one pass up the convolutional encoder, one pass down the deconvolutional decoder of the approximating posterior, and another pass down the deconvolutional decoder of the prior, conditioned on the sample from the approximating posterior. Note that if the approximating posterior is defined directly over the primary units of the deconvolutional generative model, as opposed to ancillary random variables, the final pass down the deconvolutional decoder of the prior does not actually pass signals from layer to layer. Rather, the input to each layer is determined by the approximating posterior.

Below is an outline of the computations for two adjacent hidden layers, highlighting the hierarchical components and ignoring the details of convolution and deconvolution. If the approximating posterior is defined directly over the primary units of the deconvolutional generative model, then it is natural to use a structure such as:

$$q(z_{n-1}, z_n | x, \emptyset) = q(z_{n-1} | x, \emptyset) \cdot q(z_n | z_{n-1}, x, \emptyset)$$

$$p(z_{n-1}, z_n | \theta) = p(z_n | z_{n-1}, \theta) \cdot p(z_{n-1} | \theta)$$

This builds the prior by conditioning the more local variables of the $(n-1)^{th}$ layer on the more global variables of the $n^{th}$ layer. With ancillary random variables, we might choose to use a simpler prior structure:

$$p(z_{n-1}, z_n | \theta) = p(z_{n-1}, \theta) \cdot p(z_n | \theta)$$

The evidence lower bound decomposes as:

$$\begin{aligned}\mathcal{L}_{VAE}(x, \theta, \phi) &= \log p(x|\theta) - KL[q(z_n, z_{n-1}|x, \phi) \| p(z_n, z_{n-1}|x, \theta)] \quad (3)\\ &= \log p(x|\theta) - KL[q(z_{n-1}, z_n, x, \phi) \cdot \\ &\quad q(z_n|x, \phi) \| p(z_{n-1}|z_n, x, \theta) \cdot p(z_n|x, \theta)] \\ &= \sum_{z_n} \int_{z_{n-1}} q(z_{n-1}|z_n, x, \phi) \cdot q(z_n|x, \phi) \cdot \\ &\quad \log\left[\frac{p(x|z_{n-1}, \theta) \cdot p(z_{n-1}|z_n, \theta) \cdot p(z_n|\theta)}{q(z_{n-1}|z_n, x, \phi) \cdot q(z_n|x, \phi)}\right] \\ &= \mathbb{E}_{q(z_{n-1}|z_n, x, \phi) \cdot q(z_n|x, \phi)}[\log p(x|z_n, z_{n-1}, \theta)] - \\ &\quad KL[q(z_n|x, \phi) \| p(z_n|\phi)] - \\ &\quad \sum_{z_n} q(z_n|x, \phi) \cdot KL[q(z_{n-1}|z_n, x, \phi \| p(z_{n-1}|z_n, \theta)]\end{aligned}$$

If the approximating posterior is defined directly over the primary units of the deconvolutional generative model, then it may be the case that $p(x|z_n, z_{n-1}, \theta) = p(x|z_{n-1}, \theta)$.

If both $q(z_{n-1}|z_n, x, \phi)$ and $p(z|_{n-1}z_n)$ are Gaussian, then their KL-divergence has a simple closed form, which can be computationally efficient if the covariance matrices are diagonal. The gradients with respect to $q(z_n|x, \phi)$ in the last term of Equation 3 can be obtained using the same reparameterization method used in a standard VAE.

To compute the auto-encoding portion of the ELBO, the system propagates up the convolutional encoder and down the deconvolutional decoder of the approximating posterior, to compute the parameters of the approximating posterior. In an example parameterization, this can compute the conditional approximating posterior of the $n^{th}$ layer based on both the $n^{th}$ layer of the convolutional encoder, and the preceding $(n-1)^{th}$ layer of the deconvolutional decoder of the approximating posterior. In principle, the approximating posterior of the $n^{th}$ layer may be based upon the input, the entire convolutional encoder, and layers $i \leq n$ of the deconvolutional decoder of the approximating posterior (or a subset thereof).

The configuration sampled from the approximating posterior is then used in a pass down the deconvolutional decoder of the prior. If the approximating posterior is defined over the primary units of the deconvolutional network, then the signal from the $(n-1)^{th}$ layer to the $n^{th}$ layer is determined by the approximating posterior for the $(n-1)^{th}$ layer, independent of the preceding layers of the prior. If the approach uses auxiliary random variables, the sample from the $n^{th}$ layer depends on the $(n-1)^{th}$ layer of the deconvolutional decoder of the prior, and the $n^{th}$ layer of the approximating posterior.

This approach can be extended to arbitrary numbers of layers, and to posteriors and priors that condition on more than one preceding layer, e.g. where layer n is conditioned on all layers m<n preceding it.

The approximating posterior and the prior can be defined to be fully autoregressive directed graphical models.

The directed graphical models of the approximating posterior and prior can be defined as follows:

$$q(\zeta_1, \ldots, \zeta_n | z, \phi) = \prod_{1 \leq m \leq n} q(\zeta_m | \zeta_{l<m}, x, \phi)$$

$$p(\zeta_1, \ldots, \zeta_n | \theta) = \prod_{1 \leq m \leq n} p(\zeta_m | \zeta_{l<m}, \theta)$$

where the entire RBM and its associated continuous latent variables are now denoted by $\zeta_1 = \{z_1, \zeta_1, \ldots, z_k, \zeta_k\}$. This builds an approximating posterior and prior by conditioning the more local variables of layer m on the more global variables of layer m−1, ..., 1. However, the conditional distribution in $p(\zeta_1, \ldots, \zeta_n | \theta)$ only depends on the continuous $\zeta_j$.

Figure 6:
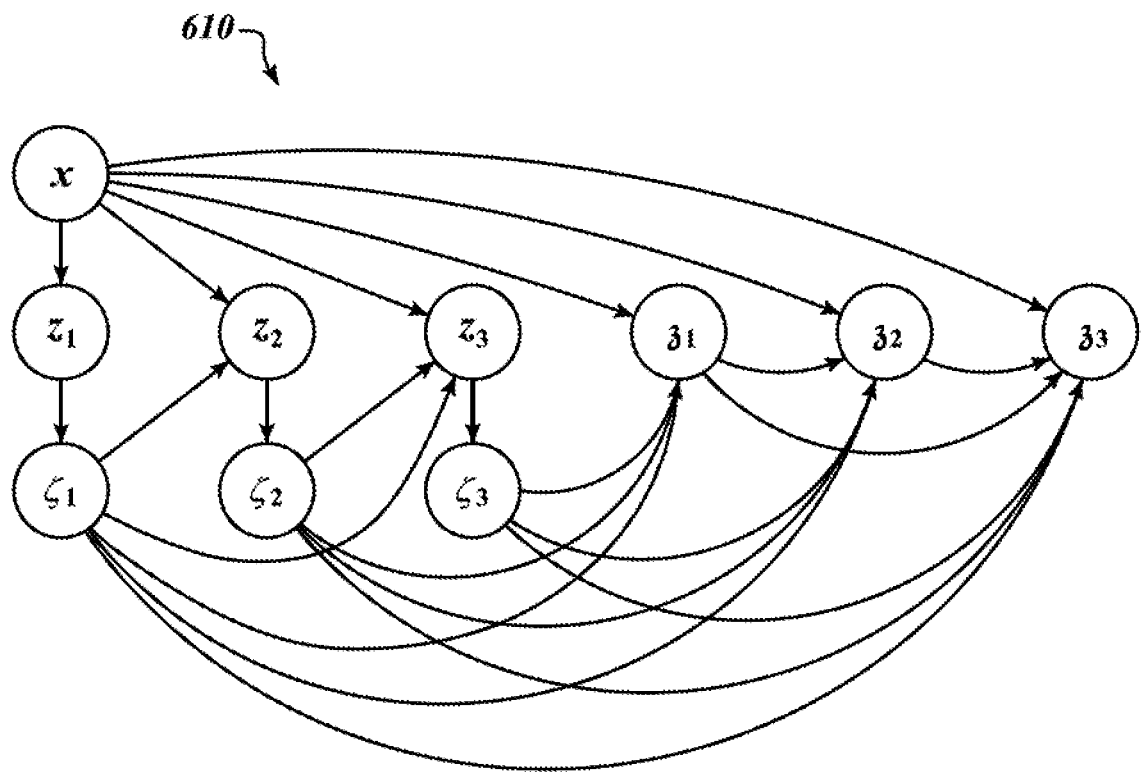
FIG. 6 is a schematic diagram illustrating an example implementation of a variational auto-encoder (VAE) with a hierarchy of continuous latent variables.
Figure 6:
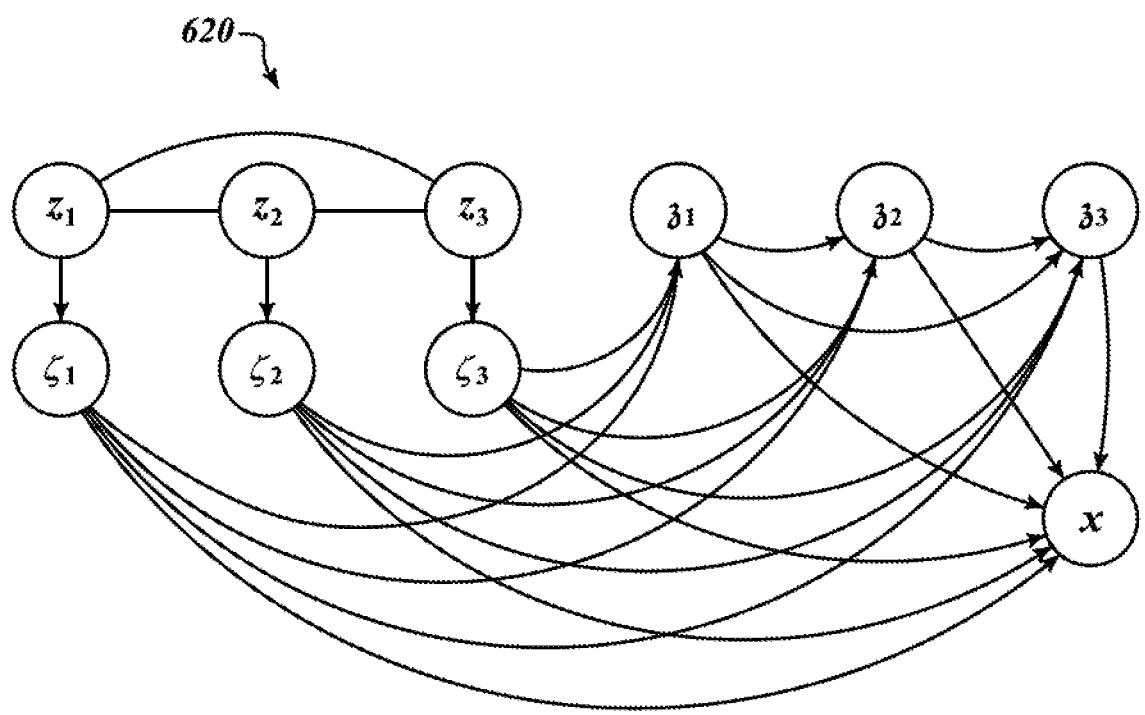

FIG. 6 is a schematic diagram illustrating an example implementation of a variational auto-encoder (VAE) with a hierarchy of continuous latent variables with an approximating posterior 610 and a prior 620.

Each $\zeta_{m>1}$ in approximating posterior 610 and prior 620, respectively, denotes a layer of continuous latent variables and is conditioned on the layers preceding it. In the example implementation of FIG. 6, there are three levels of hierarchy.

Alternatively, the approximating posterior can be made hierarchical, as follows:

$$P(\zeta_1, \ldots, \zeta_n | \theta) = \prod_{1 \leq m \leq n} p(\zeta_m | \theta)$$

The ELBO decomposes as $$\mathcal{L}(x, \theta, \phi) = \log p(x | \theta) - \quad (4)$$

$$KL\left[\prod_m q(\zeta_m | \zeta_{l<m}, x, \phi) \| \prod_m p(\zeta_m | \zeta_{l<m}, x, \theta)\right]$$

$$= \sum_{\zeta_1} \int_{\zeta_2} \cdots \int_{\zeta_n} \prod_m q(\zeta_m | \zeta_{l<m}, x, \phi) \cdot$$

$$\log\left[\frac{p(x|z, \theta) \cdot \prod_m p(\zeta_m | \zeta_{l<m}, \theta)}{\prod_m p(\zeta_m | \zeta_{l<m}, x, \phi)}\right]$$

$$= \mathbb{E}_{\prod_m q(\zeta_m | \zeta_{l<m}, x, \phi)}[\log p(x | z, \theta)] -$$

$$\sum_m \sum_{\zeta_{l<m}} \left(\prod_{l<m} q(\zeta_l | \zeta_{K<l}, x, \phi)\right) \cdot$$

$$KL[q(\zeta_m | \zeta_{l<m}, x, \phi) \| p(\zeta_m | \zeta_{l<m}, \theta)]$$

$$= \mathbb{E}_{q(\zeta | x, \phi)}[\log p(x | z, \theta)] -$$

$$\sum_m \mathbb{E}_{q(\zeta_{l<m} | x, \phi)} \cdot KL[q(\zeta_m | \zeta_{l<m}, x, \phi) \| p(\zeta_m | \zeta_{l<m}, \theta)]$$

In the case where both $q(\zeta_m | \zeta_{<m}, x, \phi)$ and $p(\zeta_m | \zeta_{l<m}, \theta)$ are Gaussian distributions, the KL-divergence can be computationally efficient, and the gradient of the last term in Equation 4 with respect to $q(\zeta_{n-1} | x, \phi)$ can be obtained by reparametrizing, as commonly done in a traditional VAE. In all cases, a stochastic approximation to the gradient of the ELBO can be computed via one pass down approximating posterior 610, sampling from each continuous latent $\zeta_i$ and $\zeta_{m>1}$ in turn, and another pass down prior 620, conditioned on the samples from the approximating posterior. In the pass down the approximating posterior, samples at each layer n may be based upon both the input and all the preceding layers m<n. To compute the auto-encoding portion of the ELBO, $p(x | \zeta)$ can be applied from the prior to the sample form the approximating posterior.

The pass down the prior need not pass signal from layer to layer. Rather, the input to each layer can be determined by the approximating posterior using equation 4.

The KL-divergence is then taken between the approximating posterior and true prior at each layer, conditioned on the layers above. Re-parametrization can be used to include parameter-dependent terms into the KL-divergence term.

Both the approximating posterior and the prior distribution of each layer $\zeta_{m>1}$ are defined by neural networks, the inputs of which are $\zeta$, $\zeta_{1>l>m}$ and x in the case of the approximating posterior. The output of these are networks are the mean and variance of a diagonal-covariance Gaussian distribution.

To ensure that all the units in the RBM are active and inactive, and thus all units in the RBM are used, when calculating the approximating posterior over the RBM units, rather than using traditional batch normalization, the system bases the batch normalization on the L1 norm. In an alternative approach, the system may base the batch normalization on the L2 norm.

Specifically, the system may use:

$$y = x - \bar{x}$$

$$x_{bn} = y/|\bar{y}| + \in) \odot s + o$$

and bound $2 \leq s \leq 3$ and $-s \leq o \leq s$.

ISTA-Like Generative Model

The training of variational auto-encoders is typically limited by the form of the approximating posterior. However, there can be challenges using an approximating posterior other than a factorial posterior. The entropy of the approximating posterior, which constitutes one of the components of the KL-divergence between the approximating and true posterior (or true prior), can be trivial if the approximating posterior is factorial, and close to intractable if it is a mixture of factorial distributions. While one might consider using normalizing flows, importance weighting, or other methods to allow non-factorial approximating posteriors, it may be easier to change the model to make the true posterior more factorial.

In particular, with large numbers of latent variables, it may be desirable to use a sparse, overcomplete representation. In such a representation, there are many ways of representing a given input, although some will be more probable than others. At the same time, the model is sensitive to duplicate representations. Using two latent variables that represent similar features is not equivalent to using just one.

A similar problem arises in models with linear decoders and a sparsity prior; i.e., sparse coding. ISTA (and LISTA) address this by (approximately) following the gradient (with proximal descent) of the L1-regularized reconstruction error. The resulting transformation of the hidden representation is mostly linear in the input and the hidden representation:

$$z \leftarrow (I - \in \cdot W^T \cdot W) \cdot z - \in \cdot \lambda \text{sign}(z) + \in \cdot W^T \cdot x$$

Note, though, that the input must be provided to every layer.

A somewhat similar approach can be employed in deconvolutional decoder of the approximating posterior. Consider the case where the conditional approximating posterior of layer $z_n$ given layer $z_{n-1}$ is computed by a multi-layer deterministic network. Rather than making a deterministic transformation of the input available to the first layer of this network, the system can instead provide the deterministic transformation of the input to the internal layers, or any subset of the internal layers. The approximating posterior over the final Gaussian units may then employ sparse coding via LISTA, suppressing redundant higher-level units, and thus allowing factorial posteriors where more than one unit coding for a given feature may be active. In the prior pathway, there is no input to govern the disambiguation between redundant features, so the winner-take-all selection must be achieved via other means, and a more conventional deep network may be sufficient.

Combination with Discrete Variational Auto-Encoder

The discrete variational auto-encoder can also be incorporated into a convolutional auto-encoder. It is possible to put a discrete VAE on the very top of the prior, where it can generate multi-modal distributions that then propagate down the deconvolutional decoder, readily allowing the production of more sophisticated multi-modal distributions. If using ancillary random variables, it would also be straightforward to include discrete random variables at every layer.

Hierarchical Approximating Posteriors

True posteriors can be multi-modal. Multiple plausible explanations for an observation can lead to a multi-modal posterior. In one implementation, a quantum processor can employ a Chimera topology. A Chimera topology can be defined as a tiled topology with intra-cell couplings at crossings between qubits within the cell and inter-cell couplings between respective qubits in adjacent cells. Traditional VAEs typically use a factorial approximating posterior. As a result, traditional VAEs have difficulty capturing correlations between latent variables.

One approach is to refine the approximating posterior automatically. This approach can be complex. Another, generally simpler, approach is to make the approximating posterior hierarchical. A benefit of this approach is that it can capture any distribution, or at least a wider range of distributions.

Figure 7:
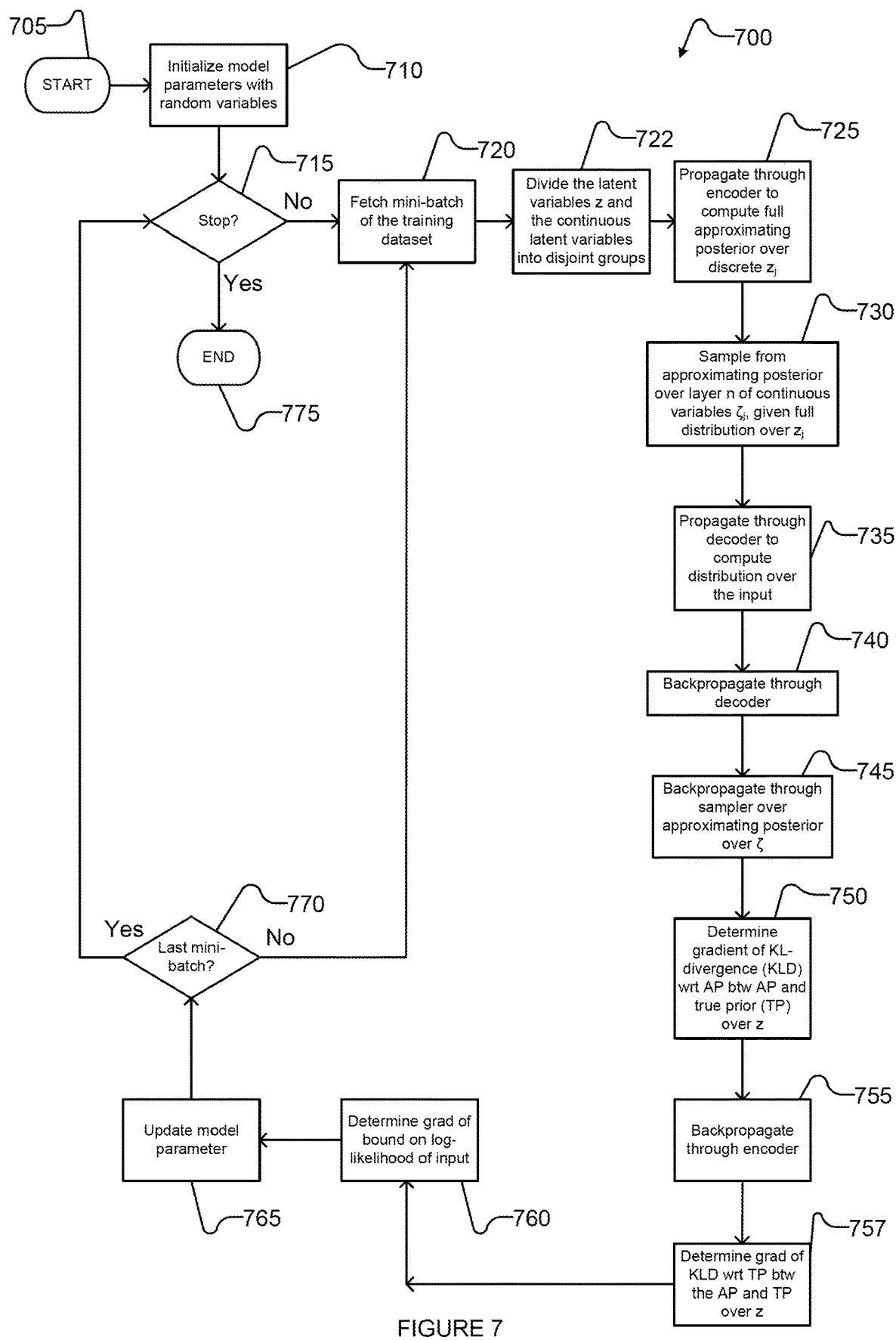
FIG. 7 is a flow chart illustrating a method for unsupervised learning via a hierarchical variational auto-encoder (VAE), in accordance with the present systems, devices, articles and methods.

FIG. 7 shows a method 700 for unsupervised learning via a hierarchical variational auto-encoder (VAE), in accordance with the present systems, devices, articles and methods. Method 700 may be implemented as an extension of method 400 employing a hierarchy of random variables.

Method 700 starts at 705, for example in response to a call from another routine or other invocation.

At 710, the system initializes the model parameters with random values, as described above with reference to 410 of method 400.

At 715, the system tests to determine if a stopping criterion has been reached, as described above with reference to 415 of method 400.

In response to determining the stopping criterion has been reached, the system ends method 700 at 775, until invoked again, for example, a request to repeat the learning.

In response to determining the stopping criterion has not been reached, the system, at 720, fetches a mini-batch of the training data set.

At 722, the system divides the latent variables z into disjoint groups $z_1, \ldots, z_k$ and the corresponding continuous latent variables into disjoint groups $\zeta_1, \ldots \zeta_k$.

At 725, the system propagates the training data set through the encoder to compute the full approximating posterior over discrete $z_j$. As mentioned before, this hierarchical approximation does not alter the form of the gradient of the auto-encoding term $\mathbb{E}$.

At 730, the system generates or causes generation of samples from the approximating posterior over n layers of continuous variables $\zeta_j$, given the full distribution over z. The number of layers n may be 1 or more.

At 735, the system propagates the samples through the decoder to compute the distribution over the input, as describe above with reference to 435 of method 400.

At 740, the system performs backpropagation through the decoder, as describe above with reference to 440 of method 400.

At 745, the system performs backpropagation through the sampler over the approximating posterior over $\zeta$, as describe above with reference to 445 of method 400.

At 750, the system computes the gradient of the KL-divergence between the approximating posterior and the true prior over z, as describe above with reference to 450 of method 400.

At 755, the system performs backpropagation through the encoder, as describe above with reference to 455 of method 400.

At 757, the system determines a gradient of a KL-divergence, with respect to parameters of the true prior distribution, between the approximating posterior and the true prior distribution over the discrete space.

At 760, the system determines at least one of a gradient or at least a stochastic approximation of a gradient, of a bound on the log-likelihood of the input data.

In some embodiments, the system generates samples or causes samples to be generated by a quantum processor, as described above with reference to 460 of method 400.

At 765, the system updates the model parameters based at least in part on the gradient, as described above with reference to 465 of method 400.

At 770, the system tests to determine if the current mini-batch is the last mini-batch to be processed, as described above with reference to 470 of method 400. In some implementations, act 770 is omitted, and control passes directly to 715 from 765. The decision whether to fetch another mini-batch can be incorporated in 715.

In response to determining that the current mini-batch is the last mini-batch to be processed, the system returns control to 715. In response to determining that the current mini-batch is not the last mini-batch to be processed, the system returns control to 720.

In summary and as described in more details above, method 700 renders the approximating posterior hierarchical over the discrete latent variables. In addition, method 700 also adds a hierarchy of continuous latent variables below them.

Computing the Gradients of the KL Divergence

The remaining component of the loss function can be expressed as follows:

$$-KL[q(z|x,\phi) \| p(z|\theta)] = \sum_z q(z|x,\phi) \cdot [\log p(z|\theta) - \log q(z|x,\phi)]$$

In some implementations, such as when the samples are generated using an example embodiment of a quantum processor, the prior distribution is a Restricted Boltzmann Machine (RBM), as follows:

$$p(z|\theta) = \frac{e^{-E_p(z,\theta)}}{Z_p} \text{ where}$$

$$E_p(z) = -z^T \cdot J \cdot z - h^T \cdot z \text{ and}$$

$$Z_p = \sum_z e^{-E_p(z,\theta)}$$

where $z \in \{0,1\}^n$, $Z_p$ is the partition function, and the lateral connection matrix J is bipartite and very sparse. The prior distribution described by the above equation contains strong correlations, and the present computational system can use a hierarchical approximating posterior.

The present method divides the latent variables into two groups and defines the approximating posterior via a directed acyclic graphical model over the two groups $z_a$ and $z_b$, as follows:

$$q(z|x,\phi) = \frac{e^{-E_a(z_a|x,\phi)}}{Z_a(x)} \cdot \frac{e^{-E_{b|a}(z_b|z_a,x,\phi)}}{Z_{b|a}(z_a, x)} \text{ where}$$

$$E_a(z_a|x) = -g_a(x)^T \cdot z_a$$

$$E_{b|a}(z_b|z_a, x) = -g_{b|a}(x, z_a)^T \cdot z_b$$

$$Z_a(x) = \sum_{z_a} w^{-E_a(z_a|x,\phi)} = \prod_{a_i \in a}(1 + e^{g_{a_i}(x)})$$

-continued $$Z_{b|a}(x, z_a) = \sum_{z_b} e^{-E_{b|a}(z_b|z_a,\phi)} = \prod_{b_i \in b}(1 + e^{g_{b_i|a}(x,z_a)})$$

The gradient $-KL[q(z|x,\phi) \| p(z|\theta)]$ with respect to the parameters $\theta$ of the prior can be estimated stochastically using samples from the approximating posterior $q(z|x) = q_a(z_a|x) \cdot q_{b|a}(z_b|z_a,x)$ and the true prior, as follows:

$$-\frac{\partial}{\partial \theta} KL[q(z|x,\phi) \| p(z|\theta)] = -\sum_z q(z|x,\phi) \cdot \frac{\partial E_p(z,\theta)}{\partial \theta} +$$

$$\sum_{z'} p(z'|\theta) \cdot \frac{\partial E_p(z'|\theta)}{\partial \theta}$$

$$= -\mathbb{E}_{q_a(z_a|x,\phi)}\left[\mathbb{E}_{q_{b|a}(z_b|z_a,x,\phi)}\left[\frac{\partial E_p(z,\theta)}{\partial \theta}\right]\right] +$$

$$\mathbb{E}_{p(z|\theta)}\left[\frac{\partial E_p(z,\theta)}{\partial \theta}\right]$$

The expectation with respect to $q_{b|a}(z_b|z_a,x,\phi)$ can be performed analytically; the expectation with respect to $q_a(z_a|x,\phi)$ requires samples from the approximating posterior. Similarly, for the prior, sampling is from the native distribution of the quantum processor. Rao-Blackwellization can be used to marginalize half of the units. Samples from the same prior distribution are used for a mini-batch, independent of the samples chosen from the training dataset.

The gradient of $-KL[q(z|x,\phi) \| p(z|\theta)]$ with respect to the parameters $\phi$ of the approximating posterior does not depend on the partition function of the prior $Z_p$, since:

$$KL(q \| p) = \sum_z (q \log q - q \log p)$$

$$= \sum_z (q \log q + q \cdot E_p + q \log Z_p)$$

$$= \sum_z (q \log q + q \cdot E_p) + \log Z_p$$

Consider a case where q is hierarchical with $q = q_a \cdot q_{b|a} \ldots$ The random variables are fundamentally continuous after marginalizing out the discrete random variables, the re-parameterization technique is used to backpropagate through $\prod_{j<i} q_{j|k \leq j}$.

The entropy term of the KL divergence is then:

$$H(q) = \sum_z q \cdot \log q$$

$$= \sum_z \left(\prod_i q_{i|j<i}\right) \cdot \left(\sum_i \log q_{i|k<i}\right)$$

$$= \sum_i \sum_z \left(\prod_{j \leq i} q_{j|k<j}\right) \cdot \log q_{i|k<i}$$

$$= \sum_i \sum_{z_i} \mathbb{E}_{\prod_{j<i} q_{j|k<j}}[q_{i|k<i} \cdot \log q_{i|k<i}]$$

$$= \sum_i \mathbb{E}_{\rho_k<i}\left[\sum_{z_i} q_{i|\rho_k<i} \cdot \log q_{i|\rho_k<i}\right]$$

where indices i, j, and k denote hierarchical groups of variables. The probability $q_{i|\rho_k<i}(z_i)$ is evaluated analytically, whereas all variables k<i are sampled stochastically via $\rho_{k<i}$. Taking the gradient of H(q) in the above equation and using the identity:

$$\mathbb{E}_q\left[c \cdot \frac{\partial}{\partial \phi} \log q\right] = c \cdot \sum_z q \cdot \left(\frac{\partial q}{\partial \phi}/q\right) = c \cdot \frac{\partial}{\partial \phi}\left(\sum_z q\right) = 0$$

for a constant c, allows elimination of the gradient of log $q_{i|\rho_{k<i}}$ in the earlier equation, and obtain:

$$\frac{\partial}{\partial \phi} H(q) = \sum_i \mathbb{E}_{\rho_{k<i}}\left[\sum_{z_i}\left(\frac{\partial}{\partial \phi} q_{i|\rho_{k<i}}\right) \cdot \log q_{i|\rho_{k<i}}\right]$$

Moreover, elimination of a log-partition function in log $q_{i|\rho_{k<i}}$ is achieved by an analogous argument. By repeating this argument one more time, $\partial(q_{i|\rho_{k<i}})/\partial \phi$ can be broken into its factorial components. If $q_{i|\rho_{k<i}}$ is a logistic function of the input and $z_i \in \{0,1\}$, the gradient of the entropy reduces to:

$$\frac{\partial}{\partial \phi} H(q) = \sum_i \mathbb{E}_{\rho_{k<i}}\left[\sum_{l \in i}\sum_{z_l} q_i(z_i) \cdot \left(z_i \cdot \frac{\partial g_l}{\partial \phi} - \sum_{z_l}(q_l(z_l) \cdot z_l \cdot \frac{\partial g_l}{\partial \phi})\right) \cdot (g_l \cdot z_l)\right]$$

$$= \sum_i \mathbb{E}_{\rho_{k<i}}\left[\frac{\partial g_i^T}{\partial \phi} \cdot (g_i \odot [q_i(z_i=1) - q_i^2(z_i=1)])\right]$$

where l and $z_l$ correspond to single variables within the hierarchical groups denoted by i. In TensorFlow, it might be simpler to write:

$$\frac{\partial}{\partial \phi} H(q) = \mathbb{E}_{\rho_{k<i}}\left[\frac{\partial q_i^T(z_i=1)}{\partial \phi} \cdot g_i\right]$$

The remaining cross-entropy term is:

$$\sum_z q \cdot E_p = -\mathbb{E}_\rho[z^T \cdot J \cdot z + h^T \cdot z]$$

The term $h^T \cdot z$ can be handled analytically, since $z_i \in \{0,1\}$, and $$\mathbb{E}_\rho[h^T \cdot z] = h^T \cdot \mathbb{E}_\rho[q(z=1)]$$

The approximating posterior q is continuous in this case, with non-zero derivative, so the re-parameterization technique can be applied to backpropagate gradients:

$$\frac{\partial}{\partial \phi} \mathbb{E}_\rho[h^T \cdot z] = h^T \cdot \mathbb{E}_\rho\left[\frac{\partial}{\partial \phi} q(z=1)\right]$$

In contrast, each element of the sum:

$$z^T \cdot J \cdot z = \sum_{i,j} J_{ij} \cdot z_i \cdot z_j$$

depends upon variables which are not usually in the same hierarchical level, so, in general:

$$\mathbb{E}_\rho[J_{ij} z_i z_j] \neq J_{ij} \cdot \mathbb{E}_\rho[z_i] \cdot \mathbb{E}_\rho[z_j]$$

This term can be decomposed into:

$$\mathbb{E}_\rho[J_{ij} z_i z_j] = J_{ij} \cdot \mathbb{E}_{\rho_{k<i}}[z_i \cdot \mathbb{E}_{\rho_{k<j}}[z_j]]$$

where, without loss of generality, $z_i$ is in a higher hierarchical layer than $z_j$. It can be challenging to take the derivative of $z_i$ because it is a discontinuous function of $\rho_{k<i}$.

Direct Decomposition of $\partial(J_{i,j} z_i z_j)/\partial \phi$

The re-parameterization technique initially makes $z_i$ a function of $\rho$ and $\phi$. However, it is possible to marginalize over values of the re-parameterization variables $\rho$ for which z is consistent, thereby rendering $z_i$ a constant. Assuming, without loss of generality, that $i<j$, $\mathbb{E}_\rho[J_{ij} z_i z_j]$ can be expressed as follows:

$$\mathbb{E}_\rho[J_{ij} z_i z_j] = J_{ij} \cdot \mathbb{E}_{\rho_{k<i}}\left[\mathbb{E}_{z_i \sim q_{i|\rho_{k<i}},\phi}[z_i(\rho,\phi) \cdot \mathbb{E}_{\rho_i|z_i}[\mathbb{E}_{\rho_{k<i}}[z_j(\rho_{z_i},\phi)]]]\right]$$

$$= J_{ij} \cdot \mathbb{E}_{\rho_{k<i}}\left[\sum_{z_i} q_i(z_1=1 \mid \rho_{k<i},\phi) \cdot z_i \cdot \mathbb{E}_{\rho_i|z_i}\left[\mathbb{E}_{\rho_{i<k<j}}\left[\sum_{z_j} q_j(z_j=1 \mid \rho_{z_i,k<j},\phi) \cdot z_j\right]\right]\right]$$

$$= J_{ij} \cdot \mathbb{E}_{\rho_{k<i}}\left[\sum_{z_i} q_i(z_i=1 \mid \rho_{k<i},\phi) \cdot z_i \cdot \mathbb{E}_{\rho_i|z_i}\left[\mathbb{E}_{\rho_{i<k<j}}[q_i(z_j=1 \mid \rho_{z_i,k<i},\phi)]\right]\right]$$

The quantity $q_i(z_j=1|\rho_{z_i,k<j},\phi)$ is not directly a function of the original $\rho$, since $\rho_i$ is sampled from the distribution conditioned on the value of $z_i$. It is this conditioning that coalesces $q_i(z_j=1|\rho_{z_i,k<j},\phi)$, which should be differentiated.

With $z_i$ fixed, sampling from $\rho_i$ is equivalent to sampling from $\zeta_i|z_i$. In particular, $\rho_i$ is not a function of $q_{k<i}$, or parameters from previous layers. Combining this with the chain rule, $\zeta_i$ can be held fixed when differentiating $q_j$, with gradients not backpropagating from $q_j$ through $\zeta_i$.

Using the chain rule, the term due to the gradient of $q_i(z_i|\rho_{k<i},\phi)$, is:

$$\frac{\partial}{\partial \phi} \mathbb{E}_\rho[J_{ij} z_i z_j] = J_{ij} \cdot \mathbb{E}_{\rho_{k<i}}\left[\sum_{z_i} \frac{\partial q_i(z_i=1)}{\partial \phi} \cdot z_i \cdot \mathbb{E}_{\rho_i|z_i}\left[\mathbb{E}_{\rho_{i<k<j}}\left[\sum_{z_j} q_j(z_j=1 \mid \rho_{k<j},\phi) \cdot z_j\right]\right]\right]$$

$$= J_{ij} \cdot \mathbb{E}_{\rho_{k<i}}\left[\mathbb{E}_{z_i \sim q_i|\rho_{k<i},\phi}\left[\frac{\partial q_i(z_i=1)}{\partial \phi} \cdot \frac{z_i}{q_i(z_i=1 \mid \rho_{k<i},\phi)} \cdot \mathbb{E}_{\rho_i|z_i}[\mathbb{E}_{\rho_{k>i}}[z_j(\rho,\phi)]]\right]\right]$$

$$= \mathbb{E}_\rho\left[J_{ij} \cdot \frac{\partial q_i(z_i=1)}{\partial \phi} \cdot \frac{z_i(\rho,\phi)}{q_i(z_i=1 \mid \rho_{k<i},\phi)} \cdot z_j(\rho,\phi)\right]$$

$$= \mathbb{E}_\rho\left[J_{ij} \cdot \frac{z_i(\rho,\phi)}{q_i(z_i=1)} \cdot q_j(z_j=1) \cdot \frac{\partial q_i(z_i=1)}{\partial \phi}\right]$$

where, in the second line, we reintroduce sampling over $z_i$, but reweight the samples so the expectation is unchanged.

The term due to the gradient of $q_j(z_j|\rho,\phi)$ is:

$$\frac{\partial}{\partial \phi}\mathbb{E}_\rho[J_{ij}z_iz_j] = J_{ij} \cdot \mathbb{E}_{\rho_{k<i}}\left[\sum_{z_i} q_i(z_i \mid \rho_{k<i}, \phi) \cdot z_i \cdot \mathbb{E}_{\rho_i|z_i}\left[\mathbb{E}_{\rho_{i<k<j}}\left[\sum_{z_j} \frac{\partial q_j}{\partial \phi} \cdot z_j\right]\right]\right]$$

$$= J_{ij} \cdot \mathbb{E}_{\rho_{k<j}}\left[\mathbb{E}_{\rho_i|\rho_{k<i},\phi}\left[z_i(\rho, \phi) \cdot \frac{z_j(\rho, \phi)}{q_j(z_j \mid \rho_{k<j}, \phi)} \cdot \frac{\partial q_j}{\partial \phi}\right]\right]$$

$$= \mathbb{E}_\rho\left[J_{ij} \cdot z_i(\rho, \phi) \cdot \frac{z_j(\rho, \phi)}{q_j(z_j=1)} \cdot \frac{\partial q_j}{\partial \phi}\right]$$

For both $z_i$ and $z_j$, the derivative with respect to $q(z=0)$ can be ignored since in light of scaling by $z=0$. Once again, gradients can be prevented from backpropagating through $\zeta_i$. Summing over $z_i$, and then take the expectation of $\rho_i$ conditioned on the chosen value of $z_i$. As a result, $q_i(z_j=1|\rho_{z_i}, k<j, \phi)$, depends upon $\zeta_i$ being fixed, independent of the preceding $\rho$ and $\phi$ in the hierarchy.

Further marginalize over $z_j$ to obtain:

$$\frac{\partial}{\partial \phi}\mathbb{E}_\rho[J_{ij}z_iz_j] = \mathbb{E}_\rho\left[J_{ij} \cdot z_i \cdot \frac{\partial q_j(z_j=1)}{\partial \phi}\right]$$

Decomposition of $\partial(J_{i,j}z_iz_j)/\partial\phi$ Via the Chain Rule

In another approach, the gradient of $\mathbb{E}_p(J_{i,j}z_iz_j)$ can be decomposed using the chain rule. Previously, z has been considered to be a function of $\rho$ and $\phi$. Instead z can be formulated as a function of $q(z=1)$ and $\rho$, where $q(z=1)$ is itself a function of $\rho$ and $\phi$. Specifically, $$z_i(q_i(z_i=1), \rho_i) = \begin{cases} 0 & \text{if } \rho_i < 1 - q_i(z_i=1) = q_i(z_i=0) \\ 1 & \text{otherwise} \end{cases}$$

The chain rule can be used to differentiate with respect to $q(z=1)$ since it allows pulling part of the integral over $\rho$ inside the derivative with respect to $\phi$.

Expanding the desired gradient using the re-parameterization technique and the chain rule, finds:

$$\frac{\partial}{\partial \phi}\mathbb{E}_q[J_{ij}z_iz_j] = \frac{\partial}{\partial \phi}\mathbb{E}_\rho[J_{ij}z_iz_j]$$

$$= \mathbb{E}_\rho\left[\sum_k \frac{\partial J_{ij}z_iz_j}{\partial q_k(z_k=1)} \cdot \frac{\partial q_k(z_k=1)}{\partial \phi}\right]$$

The order of integration (via the expectation) and differentiation can be changed. Although $z(q,\rho)$ is a step function, and its derivative is a delta function, the integral of its derivative is finite. Rather than dealing with generalized functions directly, the definition of the derivative can be applied, and push through the matching integral to recover a finite quantity. For simplicity, the sum over k can be pulled out of the expectation in the above equation, and consider each summand independently.

Since $z_i$ is only a function of $q_j$, terms in the sum over k in the above equation vanish except k=i and k=j. Without loss of generality, consider the term k=i; the term k=j is symmetric. Applying the definition of the gradient to one of the summands, and then analytically taking the expectation with respect to $\rho_i$, obtains:

$$\mathbb{E}_\rho\left[\frac{\partial J_{ij} \cdot z_i(q,\rho) \cdot z_j(q,\rho)}{\partial q_i(z_i=1)} \cdot \frac{\partial q_i(z_i=1)}{\partial \phi}\right] = \mathbb{E}_\rho\left[\lim_{\delta q_i(z_i=1) \to 0} \frac{J_{ij} \cdot z_i(q+\delta q_i, \rho) \cdot z_j(q+\delta q_i, \rho) - J_{ij} \cdot z_i(q,\rho) \cdot z_j(q,\rho)}{\delta q_i(z_i=1)} \cdot \frac{\partial q_i(z_i=1)}{\partial \phi}\right]$$

$$= \mathbb{E}_{\rho_{k \neq i}}\left[\lim_{\delta q_i(z_i=1) \to 0} \delta q_i \cdot \frac{J_{ij} \cdot 1 \cdot z_j(q,\rho) - J_{ij} \cdot 0 \cdot z_j(q,\rho)}{\delta q_i(z_i=1)} \cdot \frac{\partial q_i(z_i=1)}{\partial \phi}\bigg|_{\rho_i=q_i(z_i=0)}\right]$$

$$= \mathbb{E}_{\rho_{k \neq i}}\left[J_{ij} \cdot z_j(q,\rho) \cdot \frac{\partial q_i(z_i=1)}{\partial \phi}\bigg|_{\rho_i=q_i(z_i=0)}\right]$$

Since $\rho_i$ is fixed such that $\zeta_i=0$, units further down the hierarchy can be sampled in a manner consistent with this restriction. The gradient is computed with a stochastic approximation by multiplying each sample by $1-z_i$, so that terms with $\zeta_i \neq 0$ can be ignored, and scaling up the gradient when $z_i=0$ by $1/q_i(z_i=0)$, as follows:

$$\frac{\partial}{\partial \phi}\mathbb{E}[J_{ij}z_iz_j] = \mathbb{E}_\rho\left[J_{ij} \cdot \frac{1-z_i}{1-q_i(z_i=1)} \cdot z_j \cdot \frac{\partial q_i(z_i=1)}{\partial \phi}\right]$$

While this corresponds to taking the expectation of the gradient of the log-probability, it is done for each unit independently, so the total increase in variance can be modest.

Alternative Approach

An alternative approach is to take the gradient of the expectation using the gradient of log-probabilities over all variables:

$$\frac{\partial}{\partial \phi}\mathbb{E}[J_{ij}z_iz_j] = \mathbb{E}_q\left[J_{ij}z_iz_j \cdot \frac{\partial}{\partial \phi}\log q\right]$$

-continued $$= \mathbb{E}_{q_1, q_{2|1}, \cdots} \left[ J_{ij} z_i z_j \cdot \sum_k \frac{\partial}{\partial \phi} \log q_{k|k<k} \right]$$

$$= \mathbb{E}_{q_1, q_{2|1}, \cdots} \left[ J_{ij} z_i z_j \cdot \sum_k \frac{1}{q_{k|k<k}} \cdot \frac{\partial q_{k|k<k}}{\partial \phi} \right]$$

For the gradient term on the right-hand side, terms involving only $z_{\kappa<k}$ that occur hierarchicaly before k can be dropped out, since those terms can be pulled out of the expectation over $q_k$. However, for terms involving $z_{\kappa>k}$ that occur hierarchically after k, the expected value of $z_\kappa$ depends upon the chosen value of $z_k$.

Generally, no single term in the sum is expected to have a particularly high variance. However, the variance of the estimate is proportional to the number of terms, and the number of terms contributing to each gradient can grow quadratically with the number of units in a bipartite model, and linearly in a chimera-structured model. In contrast, in the previously described approach, the number of terms contributing to each gradient can grow linearly with the number of units in a bipartite mode, and be constant in a chimera-structured model.

Introducing a Baseline:

$$\mathbb{E}_q \left[ (J_{ij} z_i z_j - c(x)) \cdot \frac{\partial}{\partial \phi} \log q \right]$$

Non-Factorial Approximating Posteriors Via Ancillary Variables

Alternatively, or in addition, a factorial distribution over discrete random variables can be retained, and made conditional on a separate set of ancillary random variables.

$$\frac{\partial}{\partial \phi} \left( \sum_z q(z|\alpha) \cdot (z^T \cdot J \cdot z) \right) = \frac{\partial}{\partial \phi} (q^T(z=1|\alpha) \cdot J \cdot q(z=1|\alpha))$$

so long as J is bipartite. The full gradient of the KL-divergence with respect to the parameters of the approximating posterior is then as follows:

$$\frac{\partial}{\partial \phi} KL(q \| p) = \mathbb{E}_p \left[ (g_i - h - (J^T + J) \cdot q(z=1)) \cdot \frac{\partial}{\partial \phi} q(z=1) \right]$$

Other than making the distributions conditioned on the ancillary random variables α of the approximating posterior, the KL-divergence between the approximating posterior and the true prior of the ancillary variables can be subtracted. The rest of the prior is unaltered, since the ancillary random variables α govern the approximating posterior, rather than the generative model.

Implementation

The following can be parameterized:

$q(z|x,\phi) = \Pi_i q_i(z_i|x,\phi)$ using a feedforward neural network g(x). Each layer i of the neural network g(x) consists of a linear transformation, parameterized by weight matrix $W_i$ and bias vector $b_i$, followed by a pointwise nonlinearity. While intermediate layers can consist of ReLU or soft-plus units, with nonlinearity denoted by τ, the logistic function σ can be used as the nonlinearity in the top layer of the encoder to ensure the requisite range [0,1]. Parameters for each $q_i(z_i|x,\phi)$ are shared across inputs x, and $0 \le g_i(x) \le 1$.

Similarly, p(x|ζ,θ) can be parameterized using another feedforward neural network $f(\zeta)$ with complementary parameterization. If x is binary, $p_i(x_i=1|\zeta,\theta)=\sigma(f_i(\zeta))$ can again be used. If x is real, an additional neural network $f'(\zeta)$ can be introduced to calculate the variance of each variable, and take an approach analogous to traditional variational auto-encoders by using $p_i(x_i,\zeta,\theta)=\mathcal{N}(f_i(\zeta),f'_i(\zeta))$. The final nonlinearity of the network $f(\zeta)$ should be linear, and the final nonlinearity of $f(\zeta)$ should be non-negative.

Algorithm 1 (shown below) illustrates an example implementation of training a network expressed as pseudocode. Algorithm 1 describes training a generic network with gradient descent. In other implementations, other methods could be used to train the network without loss of generality with respect to the approach.

Algorithm 1 establishes the input and output, and initialize the model parameters, then it determines if a stopping criterion has been met. In addition, algorithm 1 defines the processing of each mini-batch or subset.

Algorithms 1 and 2 (shown below) comprise pseudocode for binary visible units. Since J is bipartite, $J_q$ can be used to denote the upper-right quadrant of J, where the non-zero values reside. Gradient descent is one approach that can be used. In other implementations, gradient descent can be replaced by another technique, such as RMSprop, adagrad, or ADAM.

---

Algorithm 1: Train generic network with simple gradient descent def train ( )
| Input: A data set X, where X[:, i] is the ith element, and a learning rate parameter ε
| Output: Model parameter: {W, b, $J_q$, h}
| Initialize model parameters with random values
| while Stopping criteria is not met do
| | foreach minibatch $X_{pos}$ = getMinibatch (X, m) of the training dataset do

| Algorithm 1: Train generic network with simple gradient descent |
| --- |
|   | | Draw a sample from the approx posterior $Z_{enc}, Z_{pos}, X_{out} \leftarrow$ posSamples($X_{pos}$)<br>  | | Draw a sample from the prior $Z_{neg} \leftarrow$ negSamples($Z_{neg}^{prev}$)<br>  | | Estimate $\frac{\partial \mathcal{L}}{\partial \theta}$ using calcGradients ($X_{pos}, Z_{enc}, Z_{pos}, Z_{neg}, X_{out}$)<br>  | | Update parameters according to $\theta^{i+1} \leftarrow \theta^i + \varepsilon \cdot \frac{\partial \mathcal{L}}{\partial \theta}$<br>  | end<br>  end |

At first, this approach appears to be caught between two conflicting constraints when trying to apply the variational auto-encoder technique to discrete latent representations. On the one hand, a discrete latent representation does not allow use of the gradient of the decoder, since the reparametrized latent representation jumps discontinuously or remains constant as the parameters of the approximating posterior are changed. On the other hand, $KL[q(z|x,\phi) \| p(z|\theta)]$ is only easy to evaluate if by remaining in the original discrete space.

The presently disclosed systems and methods avoid these problems by symmetrically projecting the approximating posterior and the prior into a continuous space. The computational system evaluates the auto-encoder portion of the loss function in the continuous space, marginalizing out the original discrete latent representation. At the same time, the computational system evaluates the KL-divergence between the approximating posterior and the true prior in the original discrete space, and, owing to the symmetry of the projection into the continuous space, it does not contribute to this term.

| Algorithm 2: Helper functions for discrete VAE |
| --- |
| $L_{last} \leftarrow L_{up} + L_{down}$<br>def get Minibatch (X, m)<br> | $k \leftarrow k + 1$<br> | $X_{pos} \leftarrow X[:, k \cdot m : (k + 1) \cdot m]$<br>def posSamples ($X_{pos}$)<br> | $Z_0 \leftarrow X_{pos}$<br> | for $i \leftarrow 1$ to $L_{up} - 1$ do<br> | | $Z_i \leftarrow r(W_{i-1} \cdot Z_{i-1} + b_{i-1})$<br> | end<br> | $Z_{enc} \leftarrow W_{L_{up}-1} \cdot Z_{L_{up}-1} + b_{L_{up}-1}$<br> | $Z_{pos} \leftarrow \sigma(Z_{enc})$<br> | $Z_{L_{up}} \leftarrow G_{q'(\zeta\|x,\phi)}^{-1}(\rho)$ where $q'(\zeta = 1 \| x, \phi) = Z_{pos}$ and $\rho \sim U(0, 1)^{n \times m}$<br> | for $i \leftarrow L_{up} + 1$ to $L_{last} - 1$ do<br> | | $Z_i \leftarrow r(W_{i-1} \cdot Z_{i-1} + b_{i-1})$<br> | end<br> | $X_{out} \leftarrow \sigma(W_{L_{last}-1} \cdot Z_{L_{last}-1} + b_{L_{last}-1})$<br>def negSamples ($Z_{pos}$)<br> | if using D-Wave then<br> | | sample $Z_{neg}$ from D-Wave using h and $J_q$<br> | | post-process samples<br> | else<br> | | if using CD then<br> | | | $Z_{neg} \leftarrow$ sample ($Z_{pos}$)<br> | | else if using PCD then<br> | | | $Z_{neg}$ initialized to result of last call to negSamples ( )<br> | | end<br> | | for $i \leftarrow 1$ to n do<br> | |   sample "left" half from $p\left(Z_{neg}\left[:\frac{d}{2}, :\right] = 1\right) = \sigma\left(J_q \cdot Z_{neg}\left[\frac{d}{2}:, :\right] + h\left[:\frac{d}{2}\right]\right)$<br> | |   sample "right" half from $p\left(Z_{neg}\left[\frac{d}{2}:, :\right] = 1\right) = \sigma\left(J_q^T \cdot Z_{neg}\left[:\frac{d}{2}, :\right] + h\left[\frac{d}{2}:\right]\right)$<br> | | end<br> | end |

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet including: U.S. patent application publication 2015/0006443 published Jan. 1, 2015; U.S. patent application publication 2015/0161524 published Jun. 11, 2015; U.S. provisional patent application Ser. No. 62/207,057, filed Aug. 19, 2015, entitled "SYSTEMS AND METHODS FOR MACHINE LEARNING USING ADIABATIC QUANTUM COMPUTERS"; U.S. provisional patent application Ser. No. 62/206,974, filed Aug. 19, 2015, entitled "DISCRETE VARIATIONAL AUTO-ENCODER SYSTEMS AND METHODS FOR MACHINE LEARNING USING ADIABATIC QUANTUM COMPUTERS"; U.S. provisional patent application Ser. No. 62/268,321, filed Dec. 16, 2015, entitled "DISCRETE VARIATIONAL AUTO-ENCODER SYSTEMS AND METHODS FOR MACHINE LEARNING USING ADIABATIC QUANTUM COMPUTERS"; and U.S. provisional patent application Ser. No. 63/307,929, filed 14 Mar. 2016, entitled "DISCRETE VARIATIONAL AUTO-ENCODER SYSTEMS AND METHODS FOR MACHINE LEARNING USING ADIABATIC QUANTUM COMPUTERS", each of which is incorporated herein by reference in its entirety. Aspects of the embodiments can be modified, if necessary, to employ systems, circuits, and concepts of the various patents, applications, and publications to provide yet further embodiments.

The invention claimed is:

1. A method for unsupervised learning over an input space comprising discrete or continuous variables, and at least a subset of a training dataset of samples of the respective variables, to attempt to identify the value of at least one parameter that increases the log-likelihood of the at least a subset of a training dataset with respect to a model, the model expressible as a function of the at least one parameter, the method executed by circuitry including at least one processor and comprising:
   forming a first latent space comprising a plurality of random variables, the plurality of random variables comprising one or more discrete random variables;
   forming a second latent space comprising the first latent space and a set of supplementary continuous random variables;
   forming a first transforming distribution comprising a conditional distribution over the set of supplementary continuous random variables, conditioned on the one or more discrete random variables of the first latent space;
   forming an encoding distribution comprising an approximating posterior distribution over the first latent space, conditioned on the input space;
   forming a prior distribution over the first latent space;
   forming a decoding distribution comprising a conditional distribution over the input space conditioned on the set of supplementary continuous random variables;
   determining an ordered set of conditional cumulative distribution functions of the supplementary continuous random variables, each cumulative distribution function comprising functions of a full distribution of at least one of the one or more discrete random variables of the first latent space;
   determining an inversion of the ordered set of conditional cumulative distribution functions of the supplementary continuous random variables;
   constructing a first stochastic approximation to a lower bound on the log-likelihood of the at least a subset of a training dataset;
   constructing a second stochastic approximation to a gradient of the lower bound on the log-likelihood of the at least a subset of a training dataset; and
   increasing the lower bound on the log-likelihood of the at least a subset of a training dataset based at least in part on the gradient of the lower bound on the log-likelihood of the at least a subset of a training dataset.

2. The method of 1 wherein increasing the lower bound on the log-likelihood of the at least a subset of a training dataset based at least in part on the gradient of the lower bound on the log-likelihood of the at least a subset of a training dataset includes increasing the lower bound on the log-likelihood of the at least a subset of a training dataset using a method of gradient descent.

3. The method of 2 wherein increasing the lower bound on the log-likelihood of the at least a subset of a training dataset using a method of gradient descent includes attempting to maximize the lower bound on the log-likelihood of the at least a subset of a training dataset using a method of gradient descent.

4. The method of claim 1 wherein constructing a first stochastic approximation to the lower bound of the log-likelihood of the at least a subset of a training dataset includes:
   decomposing the first stochastic approximation to the lower bound into at least a first part comprising negative KL-divergence between the approximating posterior and the prior distribution over the first latent space, and a second part comprising an expectation, or at least a stochastic approximation to an expectation, with respect to the approximating posterior over the second latent space of the conditional log-likelihood of the at least a subset of a training dataset under the decoding distribution.

5. The method of claim 1 wherein constructing a second stochastic approximation to the gradient of the lower bound includes:
   determining the gradient of the second part of the first stochastic approximation by backpropagation;
   approximating the gradient of the first part of the first stochastic approximation with respect to one or more parameters of the prior distribution over the first latent space using samples from the prior distribution; and
   determining a gradient of the first part of the first stochastic approximation with respect to parameters of the encoding distribution by backpropagation.

6. The method of claim 1 wherein a logarithm of the prior distribution is, to within a constant, a problem Hamiltonian of a quantum processor.

7. The method of claim 1, further comprising:
   generating samples or causing samples to be generated by a quantum processor; and
   determining an expectation with respect to the prior distribution from the samples.

8. The method of claim 7 wherein generating samples or causing samples to be generated by at least one quantum processor includes:
   operating the at least one quantum processor as a sample generator to provide the samples from a probability distribution, wherein a shape of the probability distribution depends on a configuration of a number of programmable parameters for the at least one quantum processor, and wherein operating the at least one quantum processor as a sample generator comprises:
      programming the at least one quantum processor with a configuration of the number of programmable parameters for the at least one quantum processor, wherein the configuration of a number of programmable parameters corresponds to the probability distribution over the plurality of qubits of the at least one quantum processor;

evolving the quantum processor; and reading out states for the qubits in plurality of qubits of the at least one quantum processor, wherein the states for the qubits in the plurality of qubits correspond to a sample from the probability distribution.

9. The method of claim 1, further comprising:

at least one of generating, or at least approximating, samples or causing samples to be generated, or least approximated, by a restricted Boltzmann machine; and determining the expectation with respect to the prior distribution from the samples.

10. The method of claim 1, wherein the set of supplementary continuous random variables comprises a plurality of continuous variables, and each one of the plurality of continuous variables is conditioned on a different respective one of the plurality of random variables.

11. The method of claim 1, further comprising:

forming a second transforming distribution, wherein the input space comprises a plurality of input variables, and the second transforming distribution is conditioned on one or more of the plurality of input variables and at least one of the one or more discrete random variables.

12. A computational system, comprising:

at least one processor; and, cause the at least one processor to:

form a first latent space comprising a plurality of random variables, the plurality of random variables comprising one or more discrete random variables;

form a second latent space comprising the first latent space and a set of supplementary continuous random variables;

form a first transforming distribution comprising a conditional distribution over the set of supplementary continuous random variables, conditioned on the one or more discrete random variables of the first latent space;

form an encoding distribution comprising an approximating posterior distribution over the first latent space, conditioned on the input space;

form a prior distribution over the first latent space;

form a decoding distribution comprising a conditional distribution over the input space conditioned on the set of supplementary continuous random variables;

determine an ordered set of conditional cumulative distribution functions of the supplementary continuous random variables, each cumulative distribution function comprising functions of a full distribution of at least one of the one or more discrete random variables of the first latent space;

determine an inversion of the ordered set of conditional cumulative distribution functions of the supplementary continuous random variables;

construct a first stochastic approximation to a lower bound on the log-likelihood of the at least a subset of a training dataset;

construct a second stochastic approximation to a gradient of the lower bound on the log-likelihood of the at least a subset of a training dataset; and increase the lower bound on the log-likelihood of the at least a subset of a training dataset based at least in part on the gradient of the lower bound on the log-likelihood of the at least a subset of a training dataset.

13. A method for unsupervised learning by a computational system, the method executable by circuitry including at least one processor and comprising:

forming a model, the model comprising one or more model parameters;

initializing the model parameters;

receiving a training dataset comprising a plurality of subsets of the training dataset;

testing to determine if a stopping criterion has been met;

in response to determining the stopping criterion has not been met:

fetching a mini-batch comprising one of the plurality of subsets of the training dataset, the mini-batch comprising input data;

performing propagation through an encoder that computes an approximating posterior distribution over a discrete space;

sampling from the approximating posterior distribution over a set of continuous random variables via a sampler;

performing propagation through a decoder that computes an auto-encoded distribution over the input data;

performing backpropagation through the decoder of a log-likelihood of the input data with respect to the auto-encoded distribution over the input data;

performing backpropagation through the sampler that samples from the approximating posterior distribution over the set of continuous random variables to generate an auto-encoded gradient;

determining a first gradient of a KL-divergence, with respect to the approximating posterior, between the approximating posterior distribution and a true prior distribution over the discrete space;

performing backpropagation through the encoder of a sum of the auto-encoding gradient and the first gradient of the KL-divergence with respect to the approximating posterior;

determining a second gradient of a KL-divergence, with respect to parameters of the true prior distribution, between the approximating posterior and the true prior distribution over the discrete space;

determining at least one of a gradient or at least a stochastic approximation of a gradient, of a bound on the log-likelihood of the input data;

updating the model parameters based at least in part on the determined at least one of the gradient or at least a stochastic approximation of the gradient, of the bound on the log-likelihood of the input data.

14. The method of claim 13, further comprising:

receiving at least a subset of a validation dataset, wherein testing to determine if a stopping criterion has been met includes determining a measure of validation loss on the at least a subset of a validation dataset computed on two or more successive passes, and testing to determine if the measure of validation loss meets a predetermined criterion.

15. The method of claim 14 wherein determining a second gradient of a KL-divergence, with respect to parameters of the true prior distribution, between the approximating posterior and the true prior distribution over the discrete space includes determining a second gradient of a KL-divergence, with respect to parameters of the true prior distribution, between the approximating posterior and the true prior distribution over the discrete space by generating samples or causing samples to be generated by a quantum processor.

16. The method of operation of claim 15 wherein generating samples or causing samples to be generated by a quantum processor includes:

operating the at least one quantum processor as a sample generator to provide the samples from a probability distribution, wherein a shape of the probability distribution depends on a configuration of a number of programmable parameters for the at least one quantum processor, and wherein operating the at least one quantum processor as a sample generator comprises:

programming the at least one quantum processor with a configuration of the number of programmable parameters for the at least one quantum processor, wherein the configuration of a number of programmable parameters corresponds to the probability distribution over the plurality of qubits of the at least one quantum processor;

evolving the at least one quantum processor; and reading out states for the qubits in plurality of qubits of the at least one quantum processor, wherein the states for the qubits in the plurality of qubits correspond to a sample from the probability distribution.

17. The method for unsupervised learning of claim 13, further comprising:

dividing the discrete space into a first plurality of disjoint groups; and dividing the set of supplementary continuous random variables into a second plurality of disjoint groups, wherein performing propagation through an encoder that computes an approximating posterior over a discrete space includes:

determining a processing sequence for the first and the second plurality of disjoint groups; and for each of the first plurality of disjoint groups in an order determined by the processing sequence, performing propagation through an encoder that computes an approximating posterior, the approximating posterior conditioned on at least one of the previous ones in the processing sequence of the second plurality of disjoint groups and at least one of the plurality of input variables.

18. The method of claim 17, wherein:

dividing the discrete space into a first plurality of disjoint groups includes dividing the discrete space into a first plurality of disjoint groups by random assignment of discrete variables in the discrete space.

19. The method of claim 17, wherein:

dividing the discrete space into a first plurality of disjoint groups includes dividing the discrete space into a first plurality of disjoint groups to generate even-sized groups in the first plurality of disjoint groups.

20. The method of claim 17, further comprising:

receiving at least a subset of a validation dataset, wherein testing to determine if a stopping criterion has been met includes determining a measure of validation loss on the at least a subset of a validation dataset computed on two or more successive passes, and testing to determine if the measure of validation loss meets a predetermined criterion.

21. The method of claim 17 wherein determining a second gradient of a KL-divergence, with respect to parameters of the true prior distribution, between the approximating posterior and the true prior distribution over the discrete space includes determining a second gradient of a KL-divergence, with respect to parameters of the true prior distribution, between the approximating posterior and the true prior distribution over the discrete space by generating samples or causing samples to be generated by a quantum processor.

22. The method of claim 21 wherein generating samples or causing samples to be generated by a quantum processor includes:

operating the at least one quantum processor as a sample generator to provide the samples from a probability distribution, wherein a shape of the probability distribution depends on a configuration of a number of programmable parameters for the analog processor, and wherein operating the at least one quantum processor as a sample generator comprises:

programming the at least one quantum processor with a configuration of the number of programmable parameters for the at least one quantum processor, wherein the configuration of a number of programmable parameters corresponds to the probability distribution over the plurality of qubits of the at least one quantum processor, evolving the at least one quantum processor, and reading out states for the qubits in plurality of qubits of the at least one quantum processor, wherein the states for the qubits in the plurality of qubits correspond to a sample from the probability distribution.

* * * * *

UNITED STATES PATENT AND TRADEMARK OFFICE
CERTIFICATE OF CORRECTION

PATENT NO. : 11,157,817 B2
APPLICATION NO. : 15/753666
DATED : October 26, 2021
INVENTOR(S) : Jason Rolfe Page 1 of 1

It is certified that error appears in the above-identified patent and that said Letters Patent is hereby corrected as shown below:

In the Claims

<u>Column 44, Line 59, Claim 15:</u>
"The method of claim 14 wherein determining a second" should read --The method of claim 13 wherein determining a second--.

Signed and Sealed this
Thirtieth Day of August, 2022

Katherine Kelly Vidal
*Director of the United States Patent and Trademark Office*